(12) United States Patent
Frolov et al.

(10) Patent No.: US 11,968,022 B2
(45) Date of Patent: Apr. 23, 2024

(54) DISTRIBUTED AIRBORNE WIRELESS COMMUNICATION SERVICES

(71) Applicant: SUNLIGHT AEROSPACE INC., Edison, NJ (US)

(72) Inventors: Sergey V. Frolov, New Providence, NJ (US); Michael Cyrus, Castle Rock, CO (US); Allan J. Bruce, Scotch Plains, NJ (US); John Peter Moussouris, Palo Alto, CA (US)

(73) Assignee: SUNLIGHT AEROSPACE INC., Edison, NJ (US)

( * ) Notice: Subject to any disclaimer, the term of this patent is extended or adjusted under 35 U.S.C. 154(b) by 522 days.

(21) Appl. No.: 14/462,167

(22) Filed: Aug. 18, 2014

(65) Prior Publication Data

US 2016/0156406 A1 Jun. 2, 2016

(51) Int. Cl.
*H04B 7/185* (2006.01)
*H04W 16/28* (2009.01)

(52) U.S. Cl.
CPC ........ *H04B 7/18504* (2013.01); *H04W 16/28* (2013.01)

(58) Field of Classification Search
CPC ... H04W 84/06; H04W 84/04; H04B 7/18504
USPC ........................................................ 455/431
See application file for complete search history.

(56) References Cited

U.S. PATENT DOCUMENTS

| | | | |
|---|---|---|---|
| 5,123,112 A | 6/1992 | Choate | |
| 5,530,909 A | 6/1996 | Simon et al. | |
| 5,557,656 A | 9/1996 | Ray et al. | |
| 5,810,284 A | 9/1998 | Hibbs et al. | |
| 6,018,659 A | 1/2000 | Ayyagari et al. | |
| 6,061,562 A | 5/2000 | Martin et al. | |
| 6,147,980 A | 11/2000 | Yee et al. | |
| 6,167,263 A | 12/2000 | Campbell | |

(Continued)

FOREIGN PATENT DOCUMENTS

EP 1 017 188 A2 12/1999
WO WO 2006/070375 A1 6/2006

OTHER PUBLICATIONS

International Search Report and Written Opinion dated Nov. 20, 2015 for PCT Application No. PCT/US2015/045675.

*Primary Examiner* — Asghar H Bilgrami
(74) *Attorney, Agent, or Firm* — MOSER TABOA

(57) ABSTRACT

Embodiments of methods and apparatus for providing distributed airborne wireless communications are provided herein. In some embodiments, an airborne wireless service area includes: an airborne fleet, comprised of a plurality of aircraft, wherein the airborne fleet is configured to transmit a plurality of first beams at a first radio frequency (RF), wherein the plurality of first beams are characterized by corresponding first frequency band, channel, bandwidth, transmission format, uneven angular field intensity distribution, and boundaries, wherein neighboring first beams have an overlap region, and wherein at least one of the following characteristics is different between the neighboring first beams: frequency band, channel, or transmission format; and a plurality of first communication cells defined by respective boundaries of the plurality of first beams, wherein each of the first communication cells are characterized by their size, shape, and position.

30 Claims, 21 Drawing Sheets

(56) References Cited

U.S. PATENT DOCUMENTS

| | | |
|---|---|---|
| 6,285,878 B1 | 9/2001 | Lai |
| 6,324,398 B1 | 11/2001 | Lanzerotti et al. |
| 6,496,143 B1 * | 12/2002 | Vail .................. H01Q 1/38 |
| | | 342/157 |
| 6,507,739 B1 | 1/2003 | Gross et al. |
| 6,628,941 B2 | 9/2003 | Knoblach et al. |
| 6,665,594 B1 | 12/2003 | Armstrong |
| 6,781,513 B1 | 8/2004 | Korkosz et al. |
| 6,788,935 B1 | 9/2004 | McKenna et al. |
| 6,804,515 B1 | 10/2004 | McCraw et al. |
| 6,944,450 B2 | 9/2005 | Cox |
| 7,073,749 B2 | 7/2006 | Krill et al. |
| 7,123,169 B2 | 10/2006 | Farmer et al. |
| 7,171,158 B2 | 1/2007 | Rosen et al. |
| 7,356,390 B2 | 4/2008 | Knoblach et al. |
| 7,463,890 B2 * | 12/2008 | Herz .................. H04L 45/00 |
| | | 370/229 |
| 7,567,779 B2 | 11/2009 | Seligsohn et al. |
| 7,610,841 B2 | 11/2009 | Padan |
| 7,702,427 B1 * | 4/2010 | Sridhar et al. .................. 701/4 |
| 7,715,838 B2 | 5/2010 | Swensen et al. |
| 7,844,218 B2 | 11/2010 | Seligsohn et al. |
| 8,135,338 B1 | 3/2012 | Gelon et al. |
| 8,186,589 B2 | 5/2012 | Ben Asher et al. |
| 8,190,147 B2 | 5/2012 | Kauffman et al. |
| 8,219,799 B1 * | 7/2012 | Lucchesi ............. H04L 63/105 |
| | | 713/150 |
| 8,448,898 B1 | 5/2013 | Frolov et al. |
| 8,646,719 B2 | 2/2014 | Morris et al. |
| 8,660,482 B2 | 2/2014 | Burr |
| 8,781,727 B1 * | 7/2014 | Bonawitz ............. G05D 1/104 |
| | | 701/410 |
| 8,787,904 B1 * | 7/2014 | Hayes .................. H04W 4/046 |
| | | 370/316 |
| 8,792,880 B2 | 7/2014 | Alcorn |
| 8,874,356 B1 * | 10/2014 | Bonawitz ............. G08G 5/0034 |
| | | 701/120 |
| 2002/0045974 A1 * | 4/2002 | Heppe ................ H04B 7/18508 |
| | | 701/3 |
| 2004/0102191 A1 | 5/2004 | Pewitt et al. |
| 2004/0253949 A1 * | 12/2004 | Swensen ............. H04B 7/18506 |
| | | 455/422.1 |
| 2005/0026608 A1 | 2/2005 | Kallio et al. |
| 2005/0090201 A1 * | 4/2005 | Lengies et al. .............. 455/41.2 |
| 2005/0151006 A1 | 7/2005 | Krill et al. |
| 2006/0040660 A1 * | 2/2006 | Cruz .................. H04B 7/18506 |
| | | 455/431 |
| 2006/0252422 A1 | 11/2006 | Kauffman et al. |
| 2010/0087190 A1 | 4/2010 | Pandit et al. |
| 2010/0154512 A1 | 6/2010 | Spinelli et al. |
| 2010/0269143 A1 * | 10/2010 | Rabowsky ............... H04N 7/20 |
| | | 725/63 |
| 2012/0091259 A1 | 4/2012 | Morris et al. |
| 2013/0044677 A1 | 2/2013 | Lucidarme et al. |
| 2013/0070677 A1 | 3/2013 | Chang |
| 2013/0324070 A1 * | 12/2013 | Bennett et al. ............. 455/404.1 |
| 2014/0099986 A1 | 4/2014 | Kikuchi et al. |
| 2014/0105054 A1 * | 4/2014 | Saegrov ............. H01Q 3/2605 |
| | | 370/252 |
| 2014/0195150 A1 * | 7/2014 | Rios ..................... B64C 39/024 |
| | | 701/469 |
| 2014/0241239 A1 * | 8/2014 | Chang ................ H04B 7/18506 |
| | | 370/316 |
| 2014/2412396 | 8/2014 | Chang |
| 2014/0332620 A1 | 11/2014 | Earon |
| 2015/0097079 A1 | 4/2015 | Frolov et al. |

\* cited by examiner

1100

1200

1500

1600

3700

| PROVIDE A NUMBER OF UAV PLATFORMS WITH PREDETERMINED CAPABILITIES | — 3710 |

| PROVIDE COMMUNICATION PAYLOAD SECTIONS WITH KNOWN REQUIREMENTS | — 3720 |

| FORM UAV FLEET WITH COMBINED PAYLOAD COMPRISED OF MULTIPLE PAYLOAD SECTIONS | — 3730 |

DISTRIBUTED AIRBORNE WIRELESS COMMUNICATION SERVICES

CROSS-REFERENCE TO RELATED APPLICATIONS

This application is related to U.S. patent application Ser. No. 14/462,122, filed Aug. 18, 2014, issued as U.S. Pat. No. 8,897,770, on Nov. 25, 2014, and U.S. patent application Ser. No. 14/462,152, filed Aug. 18, 2014, issued as U.S. Pat. No. 9,302,782, on Apr. 5, 2016, and U.S. patent application Ser. No. 14/462,369, filed on Aug. 18, 2014, issued as U.S. Pat. No. 9,083,425, on Jul. 14, 2015, and U.S. patent application Ser. No. 14/462,403, filed on Aug. 18, 2014, and U.S. patent application Ser. No. 14/462,421, filed on Aug. 18, 2014, issued as U.S. Pat. No. 9,596,020, on Mar. 14, 2017, each of which are incorporated by reference herein in their entireties.

FIELD

Embodiments of the present invention generally relate to methods and apparatus for airborne wireless communications, and in particular for enabling ground-based wireless communications using unmanned airborne platforms. Non-limiting examples include providing communication data links, voice channels, and various communication services between wireless communication devices on the ground and in the air.

BACKGROUND

Global broadband wireless communications have been growing exponentially in recent years. Network coverage, however, remains incomplete in many regions of the world and even in some currently served regions; thus demand may soon exceed the supply of existing communication infrastructure. Current network technologies are generally too expensive, ineffective, and slow to respond to growing demand.

In addition, further proliferation of existing ground-based wireless technologies increases radio-frequency (RF) pollution and human exposure to large amounts of RF energy. Many people are concerned that RF exposure might have the potential to cause certain types of cancer and other health problems. Antennas for wireless communications are typically located on towers, water tanks, and other elevated structures, including building sides and rooftops. RF emissions within 100-150 feet of a cell tower can exceed FCC limits. The standard approach to increasing wireless capacity by increasing the number of ground-based antennas per unit area will inevitably lead to an increase in the RF exposure to potentially hazardous levels.

Alternatively, there have been proposals to establish aerial networks that employ airborne platforms as additional communication hubs. Such hubs would be stationed at altitudes well above commercial airspace, where the line of sight coverage extends over large terrestrial areas and the average wind-speeds are low. These solutions were proposed as alternatives to satellite communication systems, rather than terrestrial mobile phone communication systems. Closer consideration of earlier proposals and initiatives in this area reveal many shortcomings in the defined missions, platforms, and supporting technologies as hurdles for their successful implementation. As a result, none of these proposals have been realized in practice so far.

Current broadband services are delivered via wired (e.g., optical fiber) and terrestrial wireless (e.g., cellular) networks with satellite and radio links providing auxiliary coverage beyond the reach of such networks. The inventors have observed that each of these solutions have significant constraints limiting their application and leaving many gaps in covered areas.

For example, optical fibers are well suited for fixed high-capacity links between high-usage points including continents, cities, metro-area networks, and so on. However, they require physical installation, which is expensive and may not always be practical. In addition, optical fibers are not appropriate for mobile end users.

Terrestrial cellular wireless networks are well suited for local area deployments. They are relatively inexpensive, as compared to optical fiber networks, and are the technology of choice in new and emerging markets where the physical infrastructure is limited. Terrestrial cellular wireless networks are appropriate for fixed and mobile users and may be interfaced to wired networks. However, as discrete components, they are range limited and have finite bandwidth. To meet an increasing customer demand, new towers are added to increase the coverage density, while reducing their range to enable increased frequency reuse.

Satellite links can provide additional coverage to remote and underserved regions, but they operate at RF frequencies different from those of terrestrial wireless networks, have low signal strength and require different hardware. In addition, communication satellites are extremely expensive, experience signal delays, and have bandwidth limitations.

Thus, the inventors believe that there is a need for an improved and more effective communication system architecture.

SUMMARY

Embodiments of methods and apparatus for providing distributed airborne wireless communications are provided herein. In some embodiments, an airborne wireless service area includes: an airborne fleet, comprised of a plurality of aircraft, wherein the airborne fleet is configured to transmit a plurality of first beams at a first radio frequency (RF), wherein the plurality of first beams are characterized by corresponding first frequency band, channel, bandwidth, transmission format, uneven angular field intensity distribution, and boundaries, wherein neighboring first beams have an overlap region, and wherein at least one of the following characteristics is different between the neighboring first beams: frequency band, channel, or transmission format; and a plurality of first communication cells defined by respective boundaries of the plurality of first beams, wherein each of the first communication cells are characterized by their size, shape, and position.

In some embodiments, an airborne wireless service area includes: an airborne fleet comprised of multiple aircraft; and a plurality of communication cells, wherein the communication cells are characterized by having radio frequency (RF) beams having a frequency used for communications and having corresponding frequency band, channel, bandwidth, transmission format, uneven angular field intensity distribution, and boundaries, wherein the multiple aircraft comprising equipment configured to receive the RF beams.

In some embodiments, a method of providing wireless communication services includes: transmitting a plurality of first beams at a first radio frequency (RF) from an airborne fleet comprised of a plurality of aircraft, wherein the plurality of first beams are characterized by corresponding first frequency band, channel, bandwidth, transmission format, uneven angular field intensity distribution, and boundaries, wherein neighboring first beams have an overlap region, and wherein at least one of the following characteristics is different between the neighboring first beams: frequency band, channel, or transmission format; and creating a plurality of first communication cells defined by respective boundaries of the plurality of first beams, wherein each of the first communication cells are characterized by their size, shape, and position.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
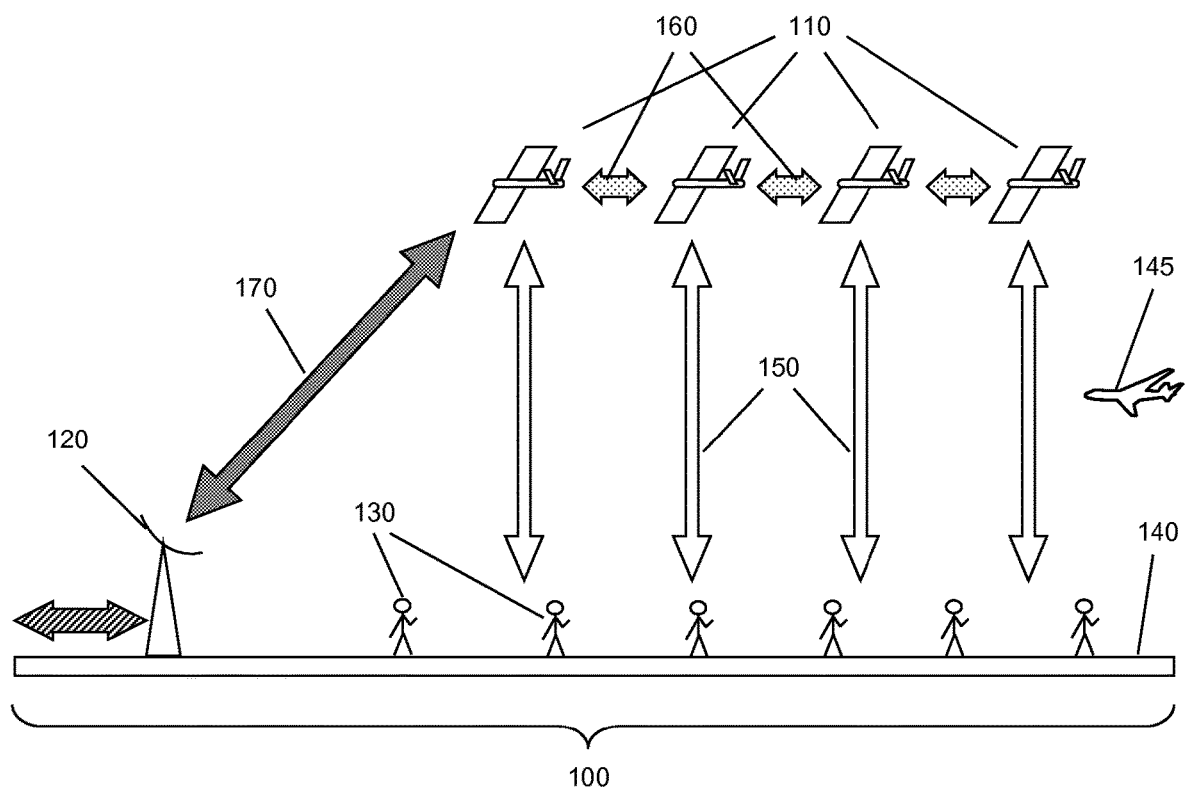
FIG. 1 depicts a schematic view of an airborne communication system in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed.

One particularly useful application of this invention is to interface with, augment, or replace existing and future terrestrial wireless networks that rely on cell towers. The envisioned network employs a fleet of high-altitude solar-, or hybrid-, powered fixed-wing airborne platforms as communication hubs. Such a system is able to use standard terrestrial wireless frequencies and protocols, simplifying integration with conventional wireless base stations and user equipment, respectively. It may operate either as a stand-alone system, or in conjunction with other terrestrial and satellite-based communication systems. In addition, the same system architecture may be used to provide one or more of fixed link communication services, emergency communications, secure communication channels, radio and/or television broadcast services, internet and cloud-based computing services, streaming, and other broadband communications services.

The platforms will generally maintain position at altitudes between about 15 and 30 km and can be capable of supporting communication links year-round. Unmanned Aerial Vehicles (UAVs) are unpiloted aircraft that are either controlled remotely or flown autonomously along pre-programmed flight plans. They are preferred platforms for implementing this airborne communication system, although other airborne vehicles may be also used under appropriate conditions, e.g., lighter-than-air aircraft. UAVs are commonly categorized based on their design and performance specifications spanning the range from miniature low altitude aircraft to larger High Altitude Long Endurance (HALE) vehicles. HALE UAVs are particularly attractive for this application for reasons described below.

The inventors have observed that previously proposed aerial communication networks without exception underestimated communication payloads and airframe requirements to physically and operationally support such payloads with the level of power generation required year-long for 24 hour continuous operation. The inventors have recognized these shortcomings, analyzed in detail the requirements for the mission, and identified significant challenges in airframe design, power generation, and energy storage, which are difficult to overcome with conventional solutions and approaches suggested thus far and which can be mission limiting, if not prohibitive.

As will be made clear from the teachings provided herein, one or more of several operational advantages that embodiments of this invention may provide as compared to existing terrestrial and satellite networks, including without limitation:

a) Low RF exposure: Airborne wireless system provide a much more uniform distribution of RF power on the ground in comparison to ground-based antennas. Furthermore, airborne communication links are usually in the line-of-sight, which reduces multipath interference. As a result, the average and maximum RF power levels on the ground for the airborne system can be substantially lower, virtually eliminating the risk of hazardous RF exposure.

b) Large-area Coverage: UAV's location means that communication links experience relatively little rain attenuation compared to terrestrial links over the same distance. At the shorter millimeter-wave bands this can yield significant link budget advantages within large cells.

c) Traffic responsivity: The invention is well suited to provide centralized adaptable resource allocation, i.e. flexible and responsive frequency reuse patterns and cell sizes unconstrained by the physical location of base-stations. This adaptability can provide significantly increased overall capacity as compared to current fixed terrestrial mapping.

d) Low cost: Airborne networks will be considerably cheaper to procure and launch than a geostationary satellite or a constellation of low earth orbit (LEO) satellites. It can also be cheaper to deploy than a terrestrial network with a large number of base-stations. The UAVs will also be designed and sized for manufacturing.

e) Incremental deployment: Airborne services can be introduced with individual UAVs and then expanded as greater coverage and/or capacity is required. This compares favorably with a LEO satellite network, which requires a large number of satellites for continuous coverage. Terrestrial networks also require a significant number of base-stations to be fully functional.

f) Rapid deployment: It is feasible to design and deploy UAV-based service quickly. Satellites, typically take years from initial procurement through launch to on-station operation, with payloads frequently obsolete by the time of launch. Similarly, terrestrial networks require time-consuming planning and civil works. UAVs, on the other hand, can be launched and placed on station within a matter of days, or even hours, enabling a rapid roll-out of services to providers keen to get in business before their competition. Rapid deployment will also be key for emergency scenarios such as natural disasters, military missions, restoration when terrestrial networks experience failure and anticipated overload due to large concentrations of transient users, e.g., at major events.

g) Maintenance and upgrades: A fleet of UAVs may operate for extended periods—weeks, months, or even years. Unlike satellites, UAVs can land for maintenance or upgrades or be replaced on station with no service disruption.

h) Low Environmental Impact: HALE UAVs have on-board renewable power generation, including solar power systems. Complementary remote power delivery can be also added to ensure reliable and continuous operation. Additional environmental benefits arise from elimination of large numbers of terrestrial towers and associated infrastructure.

In accordance with embodiments of the present invention, airborne systems are provided for enabling wireless communications services among end users on the ground and in the air. The systems generally comprise a fleet of unmanned airborne vehicles (UAVs) and an optional base-station located on the ground. UAVs carry a distributed payload that comprises wireless communication equipment. In some embodiments of the present invention, an apparatus, such as an airborne communication system 100 schematically shown in FIG. 1, may comprise a plurality of UAV platforms 110 (e.g., a fleet), an optional ground base station 120, configured to communicate with a plurality of mobile radio transceivers, as described in greater detail herein. Mobile radio transceivers may be airborne or located on the ground. For example, the mobile radio transceivers may be cellular phones held and used by individuals 130 on the ground 140 or carried on board of passenger airplanes 145, as shown in FIG. 1. Distances between different UAVs may vary and depend on their communication capabilities and requirements for communication services they provide. In general, some UAVs within the fleet may fly in close proximity to each other, so that the distance between them may be smaller than the distance to the service area (e.g. ground 140). Communication services provided by the airborne communication system 100 may be continuous or substantially continuous, e.g., 24 hours a day, 7 days a week, year round, etc. Alternatively, these services may be intermittent or temporary, e.g., one or more of only daytime operations, emergency support, peak demand services, etc.

Figure 2:
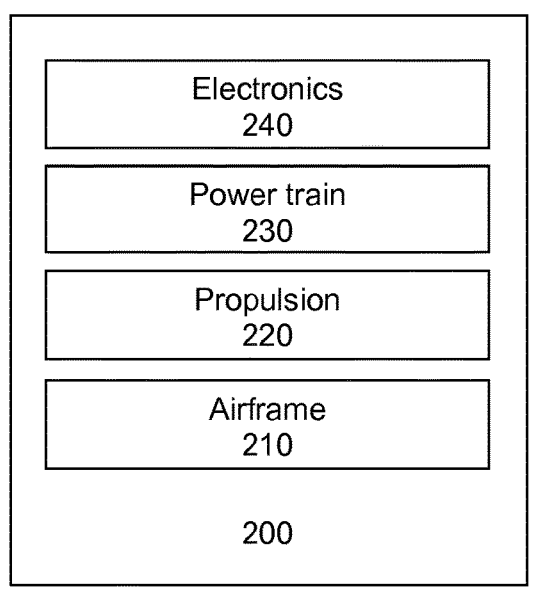
FIG. 2 depicts a schematic view of an unmanned aerial vehicle (UAV) suitable for use in an airborne communication system in accordance with some embodiments of the present invention.

UAV platforms 110 may be similar or nearly identical to each other. Alternatively, these platforms may have varying designs and differing operational characteristics. A UAV 200 suitable for this mission comprises an airframe 210, a propulsion subsystem 220, a power train subsystem 230, and an electronics subsystem 240, as shown in FIG. 2. The airframe 210 enables aerodynamically efficient long-endurance UAV flight, minimizing the power necessary to maintain the level flight and to maneuver (e.g., to make turns). This is accomplished by providing, among other things, wings with low wing loading (<5 kg/m$^2$), large wing surface (for sufficient lift and solar power generation as determined by weight and power requirements of a UAV), airfoil cross-section with high lift coefficient (>1-1.5), high wing aspect ratio (>10), low weight composite construction (e.g. based on carbon, glass or polymer fibers) and so on. Propulsion subsystem 220 provides means for acquiring and maintaining air speed (for level flight, ascent, descent, turns and other maneuvers) and includes at least a motor and a propeller. The power train subsystem 230 provides electrical power to the propulsion subsystem 220 and electronics subsystem 240. It may be a hybrid power system based on various renewable and remote energy sources, including solar energy, wind energy, thermal energy, fuel cells, combustion motor-generator sets, microwave energy and others. The solar energy may be harvested for example using a photovoltaic (PV) power system. Specific non-limiting embodiments of the UAV 200 utilizing renewable energy sources may be found, for example, in U.S. Pat. No. 8,448,898, issued May 28, 2013 to Frolov, et al., and entitled, "Autonomous Solar Aircraft". In addition, energy may be stored in the form of potential energy by increasing UAV's altitude. The electronics subsystem 240 enables flight control and operational functionality for wireless communications in the airborne communication system 100.

The fleet of UAV platforms 110 may operate at different altitudes ranging from sea level to about 30 km. An optimum altitude depends on various factors including weather conditions, local regulations for aircraft flight, aircraft capabilities and application requirements. Weather conditions are typically optimal at altitude of about 20 km, which is characterized by little cloud cover and minimal average wind speeds. However, the wind speed may still be substantial and exceed 100 km/h. The propulsion system should be capable to generate sufficient power and thrust to allow an airframe acquire airspeeds greater than wind speeds at operating altitudes (e.g., >100 km/h). High altitude operations also make it harder to generate lift, requiring larger wing surface for fixed-wing aircraft and larger volumes for lighter-than-air aircraft and further emphasizing the need for relatively light-weight airframes and payloads.

Figure 3:
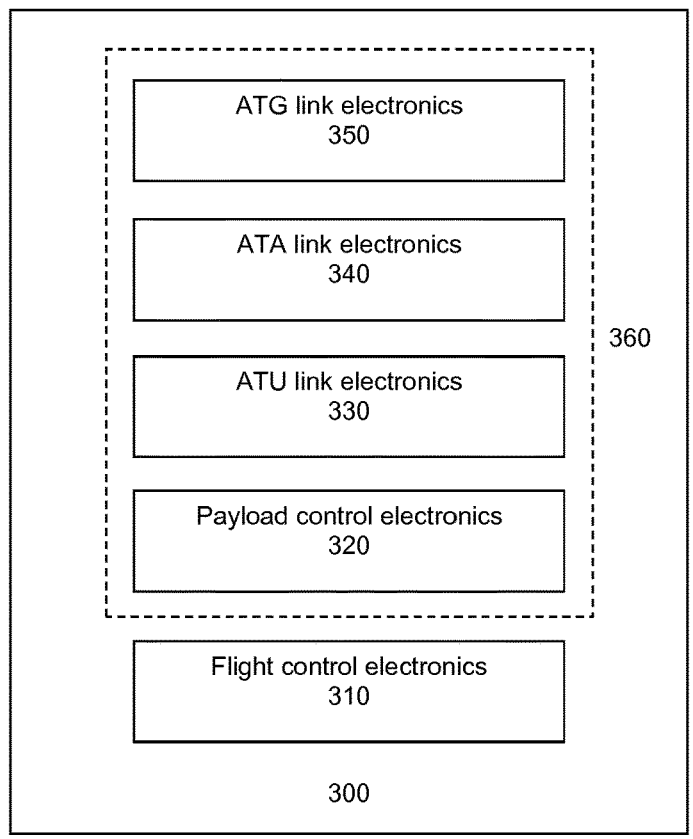
FIG. 3 depicts a schematic view of some of the major electronics components on board of a UAV suitable for use in an airborne communication system in accordance with some embodiments of the present invention.

In some embodiments, as shown schematically in FIG. 3, some of the major electronics components on board of a UAV 300, which could be used in the airborne communication system 100, may include flight control electronics 310 and payload modules. Examples of payload modules include, payload control electronics 320 (e.g., a payload control electronics module), air-to-user (ATU) link communications electronics 330 (e.g., an ATU link module), air-to-air (ATA) link communications electronics 340 (e.g., aa ATA link module), and air-to-ground (ATG) link communications electronics 350 (e.g., an ATG link module). The flight control electronics 310 may be powered by the power train subsystem 230 and provide capabilities for maneuvering of a UAV and maintaining various flight patterns. Among other elements, it may include an auto-pilot for UAV flight control and a programming interface for manual or remote input of flight parameters.

The communication payload components are required for providing communication services, rather than flight control functionality (although they may indirectly affect flight patterns and UAV flight characteristics). An airframe should have available areas and compartments for payload placement and attachment. The payload modules—i.e., the payload control electronics 320, ATU link communications electronics 330, the ATA link communications electronics 340, and the ATG link communications electronics 350— represent the main elements of the wireless communication equipment payload 360. Communication equipment may support one or more of at least three different types of communication links or channels: (1) Air-to-User (ATU) links between UAVs and mobile users/cell phones, (2) Air-to-Air (ATA) links between different UAVs, and (3) Air-to-Ground (ATG) links between UAVs and terrestrial gateway base stations. Each link may utilize a number of suitable communication formats, including frequency-domain multiple access (FDMA), time-domain multiple access (TDMA), code-domain multiple access (CDMA), and combinations thereof.

In general, the airborne communication system 100 may also include piloted aircraft, which may be used to support, replace, and/or add functionality to the unmanned airborne platforms. The piloted aircraft may be able to access restricted regions inaccessible by unmanned platforms due to local regulations, weather, or lack of renewable energy resources. Piloted aircraft may serve as a backup in emergency situations or peak demand conditions. In addition, piloted aircraft may provide secondary energy resources to other airborne platforms in the fleet, e.g., in the form of wireless RF power transfer between platforms, direct contact battery charging, refueling, and so on.

Figure 4:
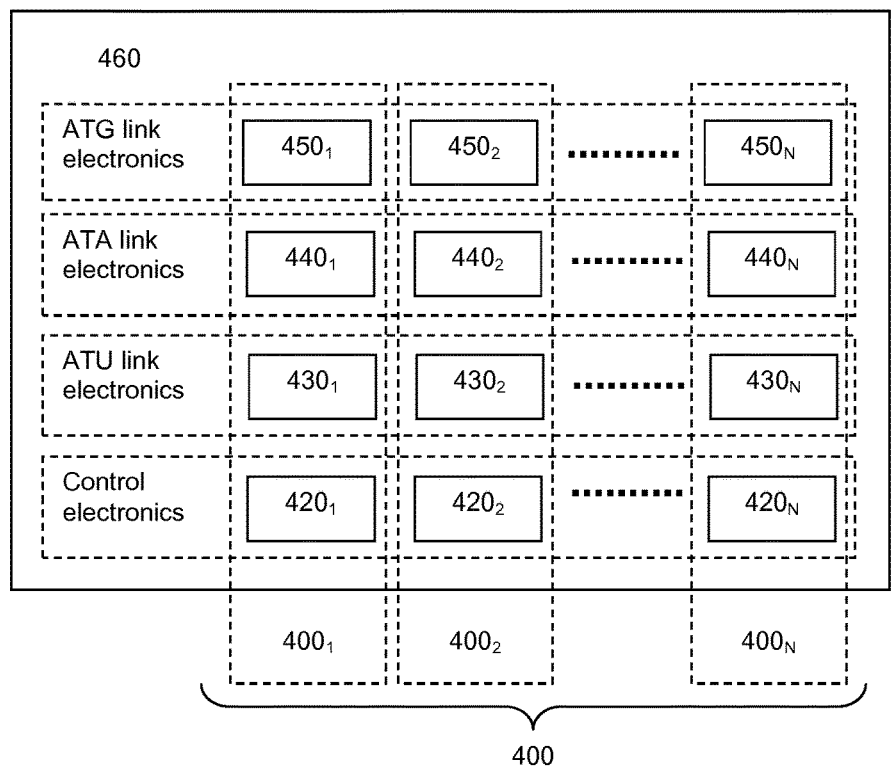
FIG. 4 depicts a representation of a divided communication payload distributed among different UAVs in an airborne communication system in accordance with some embodiments of the present invention.

The combined power and weight requirements of such a payload may be too demanding, excessive, and overwhelming for a single UAV platform. Embodiments of the present invention address this problem by splitting the payload into smaller constituent parts, thus distributing it among different UAVs in the airborne system, as shown in FIG. 4. In this case, a fleet 400 comprising a number (N) of UAVs (400$_1$ through 400$_N$) is used to carry a communication payload 460. Some or all of the communication payload 460 components (i.e., modules) may be subdivided, so that each subdivision (i.e., module section) is carried by an individual UAV platform. Each subdivision or section of the payload may be housed in a single or multiple housings to be mounted within a UAV platform. Thus, a single section housing may carry parts of multiple payload modules. For example, the UAV 400$_i$ carries payload subdivisions, or sections, of the payload control electronics 420$_i$, the ATU link equipment 430$_i$, the ATA link equipment 440$_i$, and the ATG link equipment 450$_i$, where the index i ranges from 1 to N.

The payload components may be distributed evenly or unevenly across the UAV fleet. Distribution of the payload increases system's redundancy, lowers its costs, and simplifies maintenance. Uneven distribution may help optimize payload performance, minimize overall power consumption, and increase the system's capabilities. A lone UAV with its respective payload subdivision may not be able to perform the full range of communication services and network operation. Instead, a minimum number of UAVs greater than one may be necessary to enable such an airborne communication system.

Different types of ATU links may be provided including point-to-point links, multiple access links, one-way and two-way communication links, audio and video broadcast links for radio and television, multicast/broadcast links, data and voice communication links, text messaging links, and so on. For example, two-way ATU links may be provided supporting data and voice communications via cellular phones. Such ATU links can be provided by airborne high-gain directional antennas operating in the RF range of about 0.5 to about 5 GHz, compatible with the existing cell phone technologies. The antennas can be one or more of horn antennas, analog phased arrays, digital phased arrays, and others. The serviced region on the ground can be segmented into communication service cells (e.g., communication cells), so that the same RF frequencies or channels can be reused within different segments, or cells. The directional antennas may provide different RF beams to cover the communication cells. Multiple access ATU links may be established, for example, to provide cellular communication services for end-users with hand-held mobile wireless devices, such as cell phones.

ATA links can be provided by either directional RF antennas or free-space optical interconnections, e.g., using telecom-grade lasers operating at about 1300 to about 1600 nm. The ATA links may preferably be point-to-point links, although multiple access ATA links may also be used, especially between UAVs in close proximity. This approach can enable high bandwidth (e.g., >40 Gbps) and interference free connections between different platforms in the air. ATA links may provide the shortest and cheapest available communication path between different users on the ground. ATG links may be point-to-point links and can be provided using airborne and ground based high-gain directional microwave antennas, e.g., tracking phased array antennas operating in the about 10 to about 100 GHz range. This approach enables a relatively high bandwidth (e.g., >1 Gbps/link) and interference free connections between platforms in the air and ground based gateway stations. The gateway stations also provide connections and entry points to existing wired services, such as terrestrial telecommunication networks and the internet.

Figure 5:
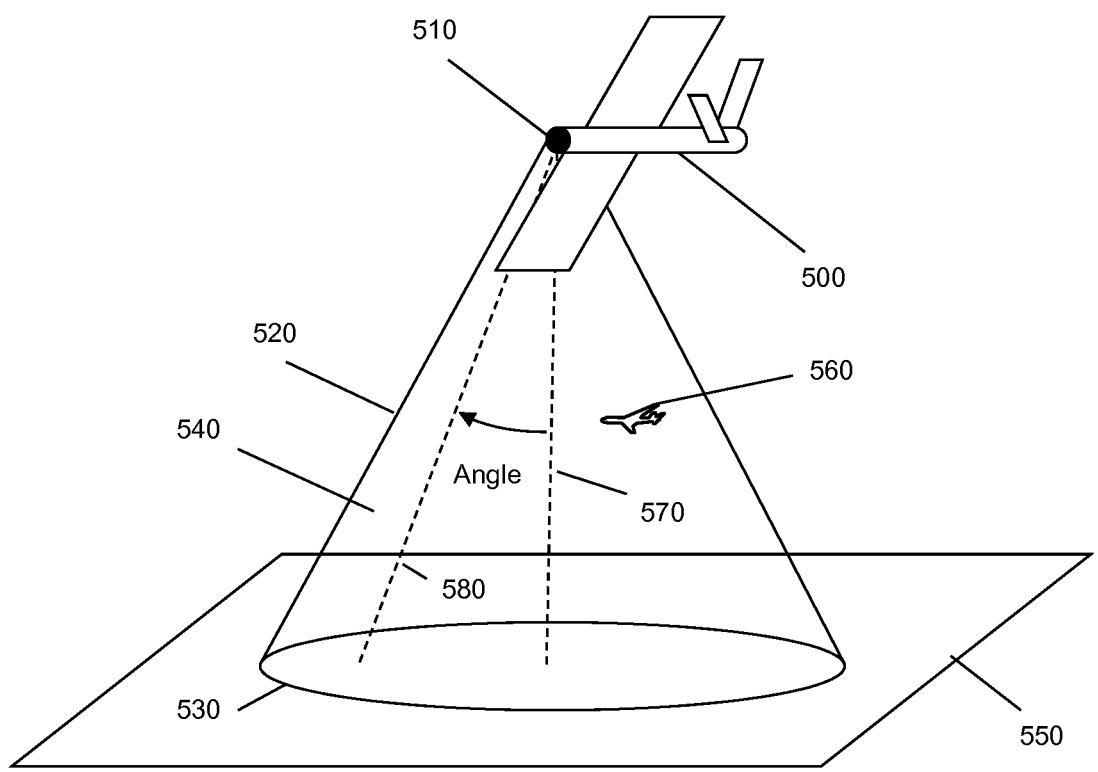
FIG. 5 depicts a schematic view of a UAV having an onboard air-to-user (ATU) antenna to produce a directed RF beam in accordance with some embodiments of the present invention.

ATU links establish wireless connections to the network users below the airborne platforms. An ATU link may be produced by a single or several UAV platforms using RF beams at one or multiple channel frequencies. In some embodiments, and as shown in FIG. 5, a single UAV 500 utilizes an onboard ATU antenna 510 to produce a directed RF beam 520 carrying communication signals (e.g., RF signals). The RF beam 520 may have a transmission direction pointing towards the ground below and cover an area on the ground 550. The area is defined by the RF beam 520 spread produced by the onboard ATU antenna 510 and may be referred to as an ATU ground cell 530. Ground-based end-users inside the same ATU ground cell may be served by the same RF beam. In addition, an ATU air cell 540 may be defined as marked and bounded volumetrically by the spread of the RF beam 520. Airborne end-users, such as those for example onboard of an airplane 560, may be serviced by the RF beam 520 while passing through the ATU air cell 540. The ATU ground cell and the ATU air cell are each also referred to as a communication cell.

Figure 6:
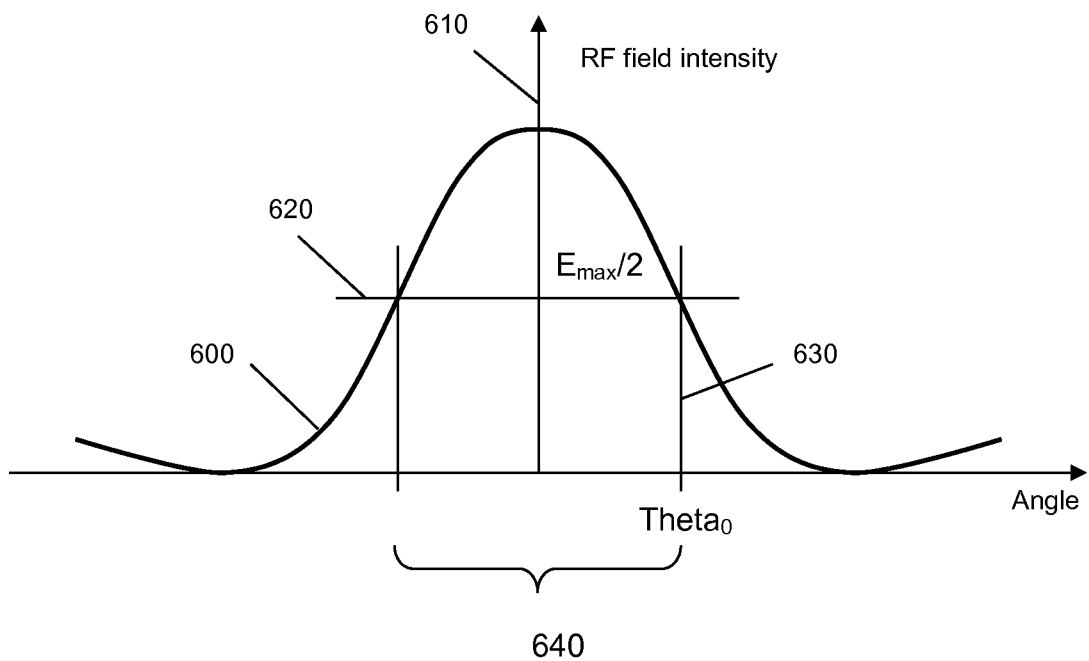
FIG. 6 depicts a graph of the field intensity distribution in a symmetric cone-shaped beam versus the angle of the beam in accordance with some embodiments of the present invention.

In the case of a symmetric cone-shape beam, the field intensity distribution in the beam versus the angle or direction (e.g., the angular field intensity distribution) may be approximated by the curve 600 shown in FIG. 6. The center of the beam is defined by the vertical axis 610, where there is a maximum in the field intensity. The angle is defined in FIG. 5 as the angle between the center of the cone 570 and an RF ray 580. The outer boundaries of the beam 630 may then be defined by the minimum level of the field intensity acceptable for establishing the ATU link or its relative strength with respect to other interfering beams, e.g., a half-maximum intensity level 620 as shown in FIG. 6. As a result, the angular spread 640 of the beam approximated by the curve 600 is given about 2 $Theta_0$ where $Theta_0$ is defined as the angle which corresponds to the minimum level of the field intensity acceptable for establishing the ATU link or its relative strength with respect to other interfering beams (e.g., the half-maximum intensity level 620 in FIG. 6). For a given altitude H, such a beam will produce an ATU ground cell with a diameter of about 2 $Theta_0 H$. In general, the RF field intensity distribution may be variable. For example, a digital phased array antenna may be able to produce RF beams of various shapes and sizes. As a result, communication cell size and shape may also vary. This feature can be used effectively to optimize operations of an airborne wireless system. In addition, RF beams may be reshaped to produce minimum interference in communication cells produced by other RF beams by generating nulls in the field intensity distribution at corresponding locations.

The above description of an embodiment refers to both modes of operating a communication channel (i.e., transmission and reception). The onboard ATU antenna 510 may be used to transmit signals, thus providing an ATU downlink, to end users in the ATU ground cell 530 and in the ATU air cell 540. Similarly, the onboard ATU antenna 510 may be used to receive signals, thus providing an ATU uplink, to end users located in the ATU ground cell 530 and in the ATU air cell 540. In this case RF beams emitted from these cells in the upward transmission direction towards a UAV (or UAVs) may be received by the onboard antenna 510. Thus two different RF beams may be used for establishing an ATU link: first—an RF beam transmitted by an ATU equipment from a UAV towards a communication cell (e.g., a first beam), and second—an RF beam emitted by from a communication cell towards a UAV and received by an ATU equipment (e.g., a second beam). Signal transmission and reception may occur on the same UAV or different UAVs, at different times or simultaneously. In the latter case, the signals may be transmitted and received at different frequencies, channels or RF bands to avoid interference. Alternatively, two different antennas may be used for simultaneous transmission and reception of RF signals within the same ATU link and/or ATU cell. ATU link communications may also include control and setup communications between the ATU link equipment and end-user's wireless communication equipment. These communications may in turn include end-user discovery, identification and registration in the communication network provided by the airborne communication fleet, as well as assignment of communication channels (both for receiving and transmitting signals) to particular end-users, mitigation of interference from obstacles and other transmitters, hand-offs between different communication cells, and so on.

Figure 7:
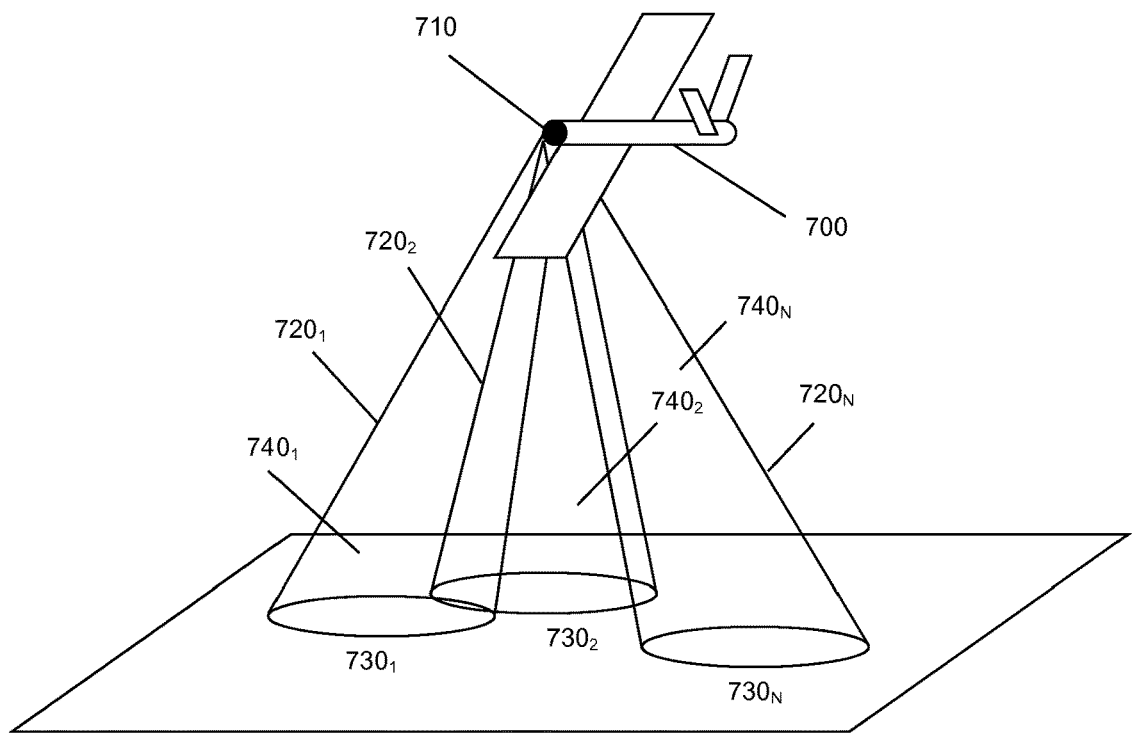
FIG. 7 depicts a schematic view of a UAV platform equipped with one or more RF antennas which produce multiple RF beams to establish multiple ATU ground cells and ATU air cells in accordance with some embodiments of the present invention.

In some embodiments, and as shown in FIG. 7, a UAV platform 700 is equipped with one or more RF antennas 710, which produce one or more RF beams $720_i$ (i ranges from 1 to N, where N is the total number of RF beams). As used herein, a "platform", or a "UAV platform", refers to an unloaded (empty) unmanned airborne vehicle used as a quasi-stationary "platform" for a communication payload or its parts. (In contrast, a "UAV" may refer to either a UAV platform without a payload or a UAV with a payload onboard, depending on a context.). As a result, several ATU ground cells $730_1$-$730_N$ and ATU air cells $740_1$-$740_N$ may be established and supported by the UAV platform 700. The corresponding ATU links may be operated in the same or different RF bands. Operation of two neighboring ATU cells at different frequencies or channels prevents interference and allows an overlap between these cells (see for example cells $730_1$ and $730_2$). Depending on the size of the cells, which may range from tens or hundreds of kilometers down to several meters, they may be categorized as super-cells (about 10-100 km), macro-cells (about 1-10 km), mini-cells (about 0.1-1 km), micro-cells (about 10-100 m), or pico-cells (about 1-10 m), respectively. A larger cell size typically means a larger number of customers and thus a higher net bandwidth demand, which in turn requires a heavier payload and higher power consumption. Therefore, while a number of smaller cells (micro- and pico-cells) may be supported by a single UAV platform as described in FIG. 7, larger cells (super- and macro-cells) may require more than a single platform because of their more demanding requirements.

Figure 8:
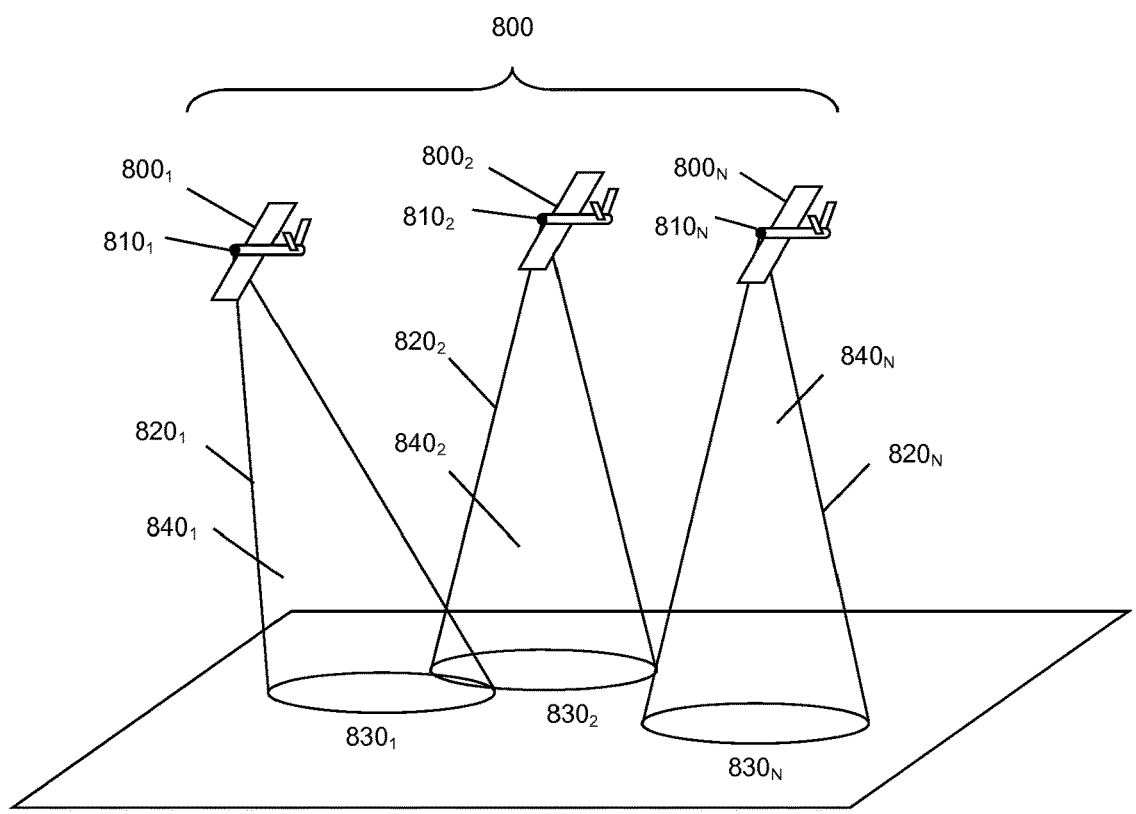
FIG. 8 depicts a schematic view of a UAV fleet comprising a plurality of UAV platforms each equipped with an RF antenna to produce respective RF beams which establish multiple ATU ground cells and ATU air cells in accordance with some embodiments of the present invention.

In another embodiment shown in FIG. 8, an airborne fleet, such as a UAV fleet 800 (also referred to as a set, swarm, group, flock, cluster, convoy, collection, or constellation) consisting of N number of UAV platforms $800_1$-$800_N$ provides communication services in the space underneath, where each UAV platform $800_i$ carries an antenna $810_i$, producing an RF beam $820_i$, and projecting ATU ground cell $830_i$ and ATU air cell $840_i$ (where i ranges from 1 to N). Antennas $800_1$-$800_N$ may operate at the same or different frequencies, channels, or RF bands. The UAV fleet 800 may provide the same capabilities for its end users as the single UAV platform 700. However, it allows the communication payload to be split into smaller parts and makes the airborne communication service more robust, scalable, and sustainable. For example, the RF antennas $810_1$-$810_N$ are the elements of the same communication payload, each carried by a separate UAV platform $800_1$-$800_N$ respectively. In addition, this approach allows each UAV platform to hover and circle directly above their corresponding ATU ground cells. Airborne platforms may maintain their position by hovering or circling above predetermined positions specified in GPS coordinates. This results in a vertical line-of-sight (LOS) between a UAV platform and an end-user, which minimizes the transmission distance, scattering losses, and multipath fading. ATU links, which are angled with respect to the vertical direction normal to the ground surface, experience higher loss and therefore may require larger RF power for transmission and reception.

Figure 9:
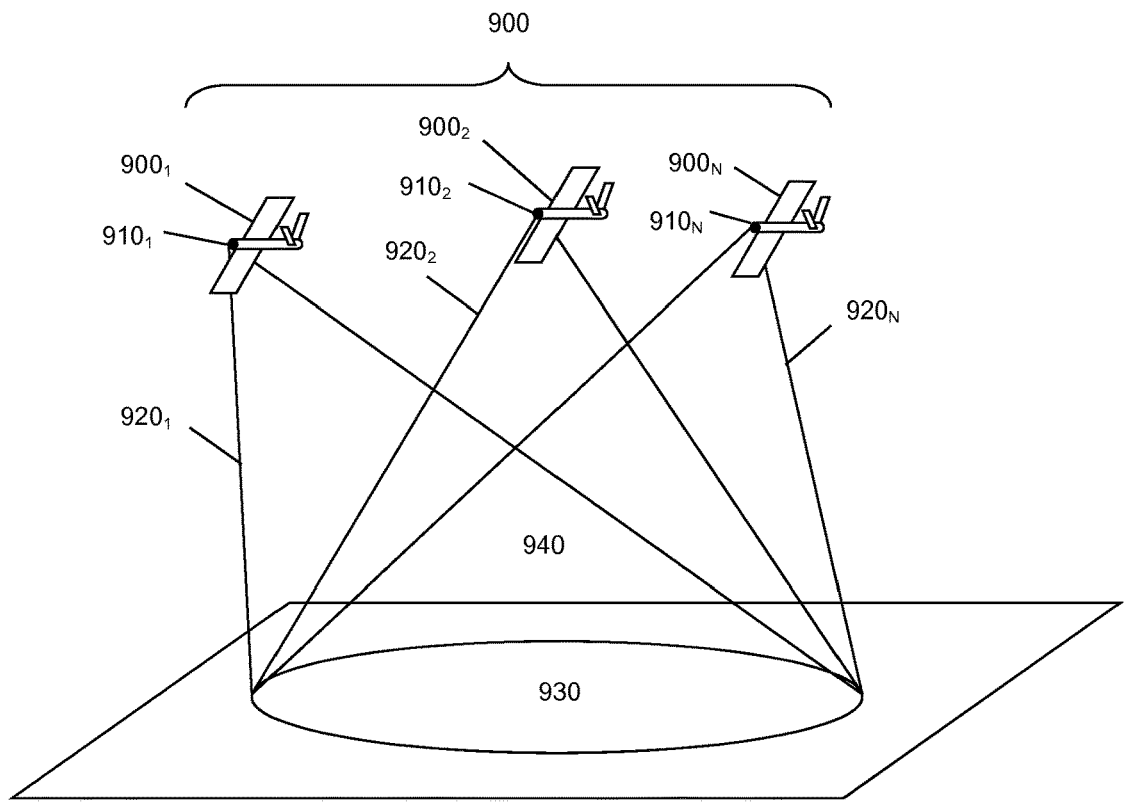
FIG. 9 depicts a schematic view of a UAV fleet that provides communication services in accordance with some embodiments of the present invention.

In another embodiment shown in FIG. 9, a UAV fleet 900 consisting of N number of UAV platforms $900_1$-$900_N$ provide communication services in the space underneath, where each UAV platform $900_i$ carries an antenna $910_i$, producing an RF beam $920_i$, and projecting onto common ATU ground cell 930 and ATU air cell 940 (where i ranges from 1 to N). Antennas $910_i$ may operate at different frequencies, channels, or RF bands to avoid interchannel interference, in effect increasing traffic capacity in the ATU ground cell 930 (and ATU air cell 940) by frequency multiplexing. Alternatively or additionally, they may share some or all of their operational frequencies and use other multiplexing approaches: (a) time multiplexing, (b) polarization multiplexing, (c) spatial/positional multiplexing, or the like. Time multiplexing may be achieved by allotting special time frames in an ATU channel for each UAV platform $900_i$ to transmit and/or receive communication signals. Polarization multiplexing may be accomplished by configuring the antennas $910_i$ to receive and transmit polarized RF radiation in orthogonally polarized (i.e., non-interfering) states. Spatial and positional multiplexing may be realized by using multiple-input multiple-output (MIMO) approaches for increasing channel capacity. An end-user within the ATU ground cell 930 and the ATU air cell 940 may be able to use available ATU links, channels and frequencies from one or more UAV platforms $900_1$-$900_N$ simultaneously, concurrently, constantly or intermittently.

The airborne communication system that is in part embodied by the UAV fleet 900 in FIG. 9 relies even more on a concept of subdividing a communication payload into smaller and more manageable parts. This distributed payload approach is distinctly different from prior art, where the conventional wisdom has been to use a single UAV platform and push its performance limits to cover and serve the largest ground area possible. The inventors see their new approach as more advantageous for several reasons. From the UAV platform perspective, it is easier and cheaper to design, manufacture, and operate smaller UAVs. The UAV airframe weight scales approximately as the cube of its size, while the size (wing span) increases as the square root of the wing area. Therefore, for the same wing area (and thus available solar power) 10 smaller UAVs will have the combined weight of less than 3 times the weight of a single large UAV ($\sim(10)^{3/2}/10$). The wing loading is thus much smaller for smaller UAVs, which means they are more aerodynamically efficient. It is also possible to further reduce total power consumption in a UAV fleet by dynamic task scheduling between different UAVs, arranging UAVs in flight formations for improved aerodynamics, wireless energy exchange between different UAVs, and so on. As a result, it takes much less power for a fleet of relatively small UAVs to maintain flight and there is more power available for the payload in comparison to a large single UAV.

From the system perspective, the distributed payload approach increases system reliability and introduces built-in redundancy. If one small UAV platform fails, the remaining platforms may fill in and provide temporary or permanent back-up operations for the missing UAV, so that the system will continue to function normally without any interruptions for end-users. It is also easier to maintain smaller UAV operations. They can be brought down and landed on a periodic maintenance schedule for upgrades, repairs and refueling if necessary, which much more difficult and challenging to do with a large single platform. A communication system with a distributed airborne payload is very scalable, so that the number of UAVs required for providing communication services may be changed and adjusted depending on the demand for services, seasonal changes or atmospheric conditions. This strategy ensures a good match between the deployed airborne resources (supply of services) and the required bandwidth and area coverage (demand for services).

From the end-user perspective, this invention discloses a new way to provide communications to personal mobile devices (like cell phones), which is better than either current terrestrial systems, satellite-based systems, or any of the previously proposed airborne systems. The ATU links as shown in the described embodiments are compatible with existing cellular technology, so that end-users may conveniently use their existing devices to order to become a part of this airborne communication network. The distributed payload approach makes this not only feasible, but also safer. In case of an accident or emergency, a smaller UAV may be brought down much safer and with less risk compared to any larger UAV. Also, a larger UAV constantly hovering above in the sky is much more visible than a small UAV and may represent an eye sore and cause for concern to the general public.

The airborne fleet is configured to provide a plurality of communication cells (e.g., ATU cells) by projecting a plurality of RF beams to create a communication cell by each respective RF beam. The plurality of communications cells may each be substantially the same (e.g., have substantially equal size and/or shape), or at least one communication cell may be different than others of the plurality of communication cells (e.g., at least one communication cell has a size and/or shape that is different than the other communication cells).

Figure 10:
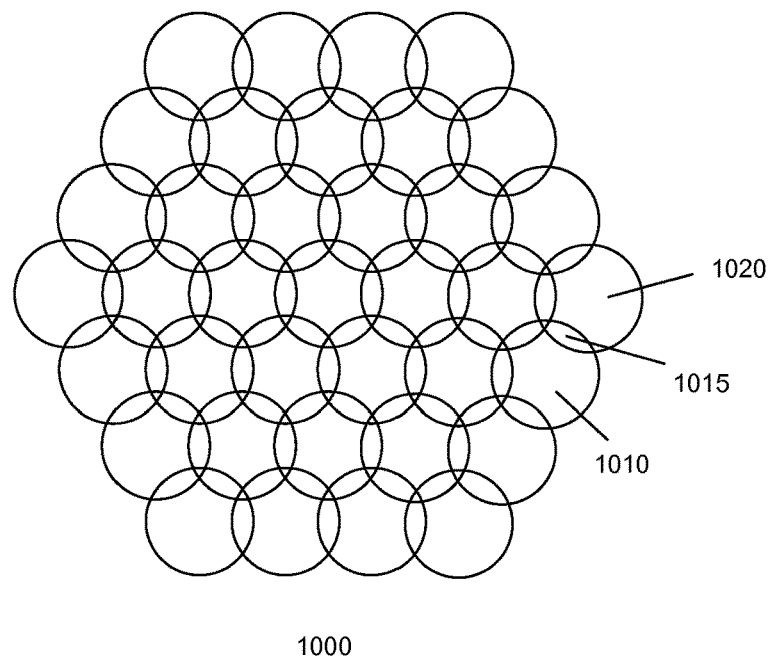
FIG. 10 depicts a ground projection of a cellular map composed of approximately similarly sized and shaped communication cells in accordance with some embodiments of the present invention.

For example, FIGS. 10-13 show exemplary embodiments for cellular mapping of an airborne wireless service area, which characterize another part of the distributed airborne communication system. FIG. 10 shows the ground projection of a cellular map 1000, which is composed of approximately similarly sized (e.g., substantially equally sized) and shaped communication cells. Each cell may be produced and serviced by one or more UAV platforms. A single UAV platform may produce one or more of these cells. The shapes of corresponding ATU ground cells and ATU air cells are circular and conical, respectively. Neighboring cells may overlap, so that for example cells 1010 and 1020 may have an overlap region 1015. In order to avoid interference in region 1015, the channels used in cells 1010 and 1020 may differentiate from each other by using different frequencies, polarizations, spatial positioning, and so on. In addition, each cell may be further segmented in subcells, regions, sectors, and segments with differing characteristics in order to increase frequency spectrum reuse.

Figure 11:
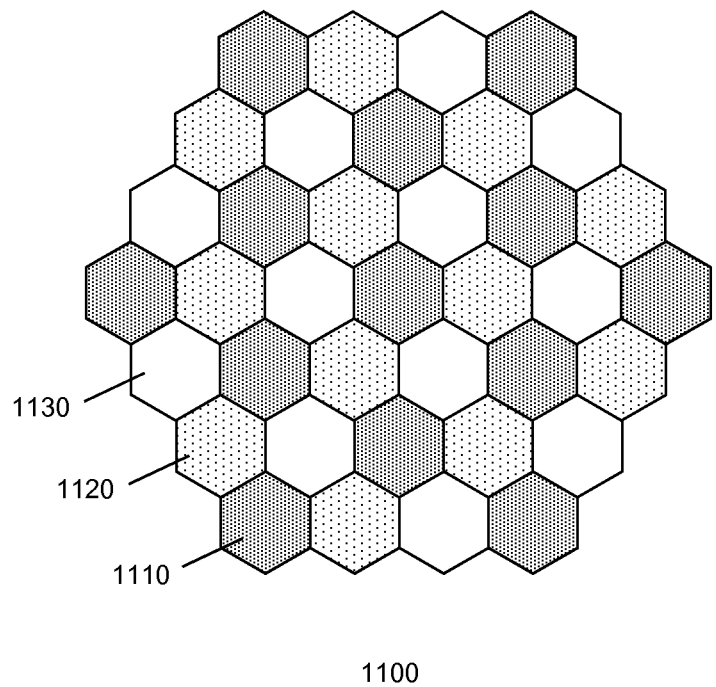
FIG. 11 depicts a ground projection of a cellular map composed of approximately similarly sized hexagonal communication cells in accordance with some embodiments of the present invention.

Ignoring the overlap regions, the same or similar cellular map may be represented by a map 1100 in FIG. 11, which comprised of hexagonal cells. In this example, three types of cells are identified as 1110, 1120, and 1130, corresponding to different frequency ranges. These cells may be repeated in a non-interfering pattern as shown in FIG. 11 to fill an entire region without gaps in coverage. Unlike terrestrial cellular maps, these maps produced by airborne communication platforms are not affected by radio wave propagation and scattering near ground surface. Consequently, they provide much more even signal intensity distribution and enable more effective planning, allocation and forecasting for communication services.

A particular characteristic of cellular mapping that have not been previously realized or even identified in prior art, particularly in regard to existing terrestrial wireless systems, is the ability to control the size, shape, and layout of cellular mapping and each given cell inside of it. The RF signal intensity pattern and distribution in terrestrial systems are fixed and given by the locations of cellular communications towers and other wireless network antennas and transceivers. In the present invention, the communication cell shape, size, and position is not fixed and may be varied or maintained, because it is mostly determined by the emission characteristics of the RF antennas onboard of the UAV platforms, which may be controlled. For example, an antenna may be set to point in a new direction (e.g., a transmission direction), which will change the position of a corresponding communication cell to a new location. A phased array antenna may be used to produce a beam or multiple beams with shapes and sizes that can be changed on command to fit specific needs of an application at that locale. A digital phased array antenna may be used to change the size, shape, or location of the RF beam and corresponding ATU cells electronically without moving any relevant mechanical parts. Thus, in some embodiments, at least one communication cell can have at least one of a fixed size, shape, or position. And, in some embodiments, at least one communication cell has at least one of a variable size, shape, or position.

Figure 12:
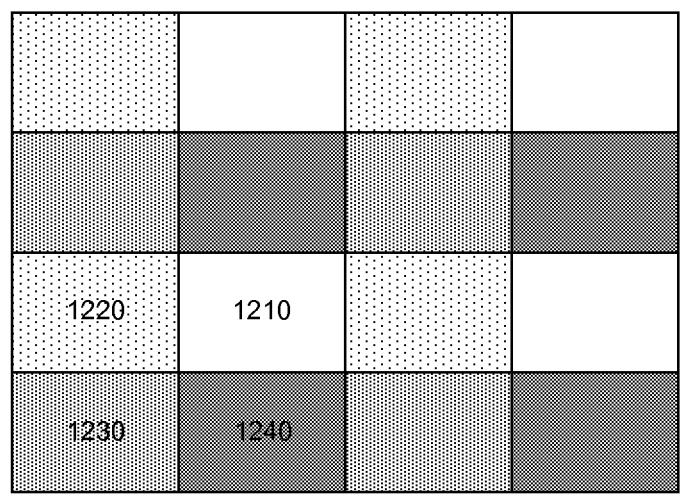
FIG. 12 depicts a ground projection of a cellular map composed of approximately similarly sized rectangular communication cells in accordance with some embodiments of the present invention.
Figure 13:
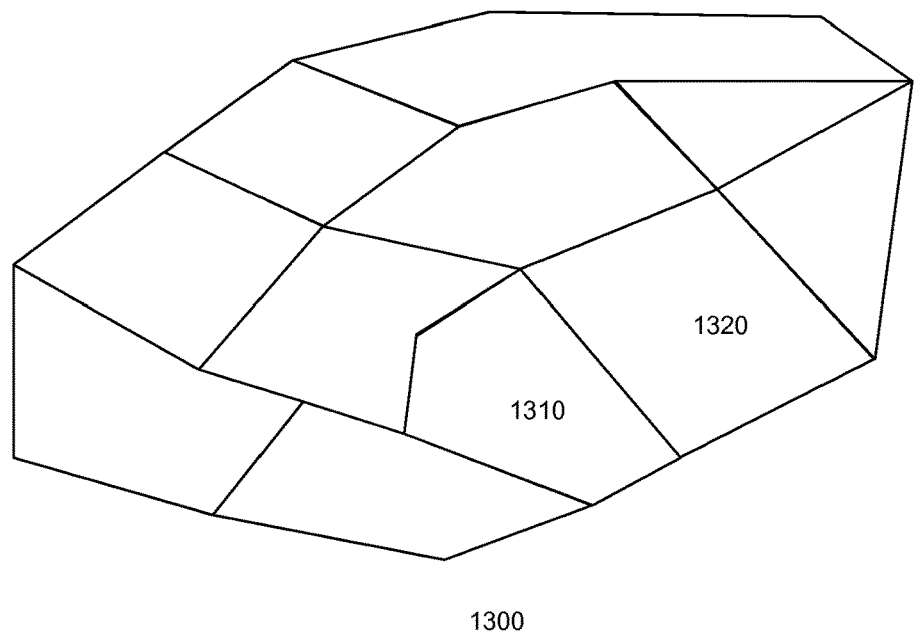
FIG. 13 depicts a ground projection of a cellular map composed of irregularly sized and shaped cells in accordance with some embodiments of the present invention.

In another embodiment of the present invention, FIG. 12 shows a cellular map 1200 comprising rectangular-shaped ATU cells. Four types of such cells 1210, 1220, 1230, and 1240, each operating in respectively four different frequency spectral ranges, may be used to effectively cover arbitrary size region in a non-interfering pattern, i.e., a pattern which doesn't have neighboring or overlapping region with operating in the same frequency range. Additional frequency regions may be added and/or the cells may be subdivided into smaller divisions in order to increase frequency utilization and overall system capacity. The cells in FIG. 12 may also have different sizes and shapes, while preserving the same overall topology. Also, the cellular map may be made up of completely irregular and dissimilar cells. FIG. 13 shows a cellular map 1300 comprised of several irregular cells. For example, FIG. 13 illustrates neighboring cells 1310 and 1320, which are dissimilar in size and shape.

Such cellular maps are impossible to achieve with regular terrestrial wireless systems. However, they may be advantageous to minimize communication hand-offs between different cells. When an end-user crosses from one cell to another, a communication system must perform a hand-off procedure, which may take additional resources and affect service quality. This situation typically occurs along roads and highways, due to vehicular traffic in these areas. A cellular map may be designed to better fit the pattern of end-user movements to minimize the hand-offs, e.g., by referencing the map against road maps and end-user traffic patterns. This can be accomplished in some embodiments of this invention by using an airborne communication system with UAV platform equipped with phased array antennas, which in turn can control and maintain an arbitrary cellular map, cell shapes, sizes, boundaries, and/or their positions with respect to one or more reference points on the ground, e.g., landmarks such as natural features and man-made structures. For example, in some embodiments, the communication cell boundaries may be aligned with landmarks on the ground. In addition, the cellular map may be altered, changed, and reconfigured at any time in response to changes in customer demand, internal network status, external factors, and other considerations. Furthermore, instead of maintaining a cellular map that is fixed and referenced with respect to specific locations or markers on the ground, it is possible to create and maintain a floating cellular map that may be either constantly or occasionally moving with respect to end-users on the ground. In this case other reference points for cellular mapping may be used, such as for example the airborne platforms themselves or virtual reference points maintained and calculated by the software running the operating system of the airborne network.

The ATU link may be characterized by the transmission and reception ranges, i.e. the maximum distances for transmitting signals to and receiving signals from an end-user, respectively. These ranges in general depend on the transmitted signal power, atmospheric conditions, transmission format and rate, multipath interference and other factors. The advantage of an airborne communication system is that it minimizes the effect of the multipath interference, which represents one of the dominant factors in signal loss in terrestrial wireless communication systems. For an airborne system the average transmission and reception range is about equal to the altitude of the airborne system, which may be in the range of about 17 to about 20 km. This distance may be substantially smaller than the average distance between different airborne platforms, which may be in the range of about 10 m to about 10 km. In contrast, the communication range in a terrestrial cellular system is less than a distance between cellular communication towers, for example, about one half of the average distance between cellular communication towers, such as in the range of about 1 to about 5 km.

Figure 14:
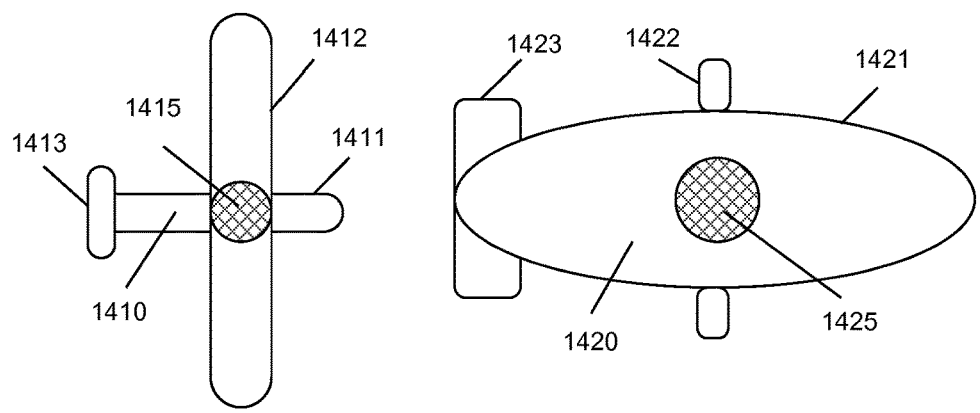
FIG. 14 depicts a schematic view of several airborne platforms capable of carrying communication payloads and performing functions necessary for enabling an airborne wireless communication network in accordance with some embodiments of the present invention.
Figure 14:
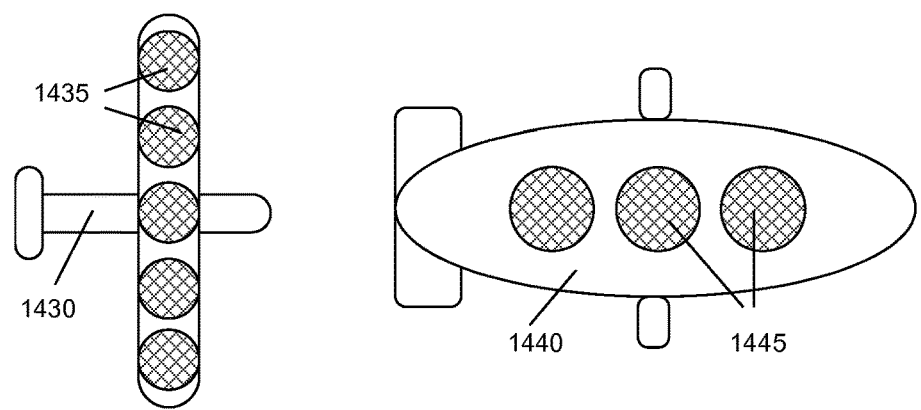
Figure 15:
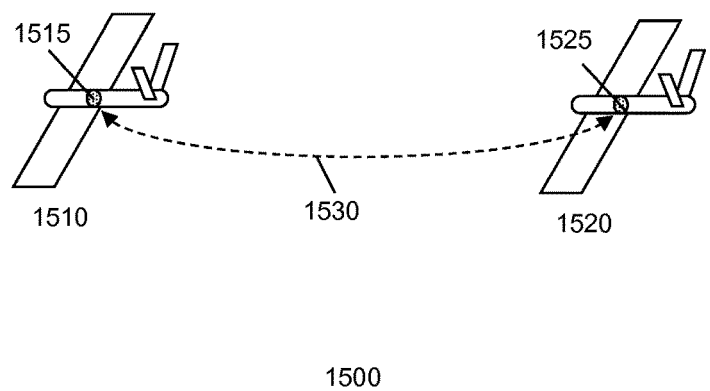
FIG. 15 depicts a schematic view of a communication subsystem for establishing air-to-air (ATA) links between individual UAVs or other airborne platforms in an airborne wireless communication system in accordance with some embodiments of the present invention.

In accordance with the present invention, FIG. 14 shows exemplary embodiments of several airborne platforms capable of carrying communication payloads and performing functions necessary for enabling an airborne wireless communication network. A platform 1410 is a fixed-wing, heavier-than-air UAV comprising at least a fuselage 1411, a wing 1412, and a tail 1413 (propellers are not shown). The platform 1410 is capable of carrying a payload or parts of a payload inside and outside of constituent elements of the platform 1410. An RF antenna 1415, as a part of the payload, may be mounted to the bottom of a fuselage of the platform 1410, or integrated into a skin of the platform 1410, as shown in FIG. 14. A platform 1420 is a lighter-than-air aerostat or an airship, which includes at least an airship shell or a hull 1421, propellers 1422, and a tail 1423. An RF antenna 1425 may be mounted to the bottom of the hull or integrated into a shell or cover of the hull 1421, as shown in FIG. 14. Both RF antennas 1415 and 1425 may be used to create one or more directed, arbitrary shaped RF beams for transmitting and receiving signal from the ground and air space below. Furthermore, a UAV 1430 and an airship 1440 may be equipped with multiple RF antennas 1435 and 1445, as shown in FIG. 15, to produce multiple RF beams. Each beam may than produce a corresponding ATU cell for establishing an ATU link. The use of UAVs as the platform for airborne communications is advantageous because of UAV's ability to move quickly and withstand high winds. The use of airships as the platform for airborne communications may be also advantageous because of their ability to conserve energy in still air and provision of large surfaces available for sunlight energy collection. Although in general the use of UAVs is preferred, there may be situations and conditions where the use of airships is more advantageous. Furthermore, a potentially more flexible and reliable airborne system may be produced with a combination of UAV and airship platforms in the same airspace, which could deliver advantages of both technologies.

In accordance with some embodiments of the present invention, FIG. 15 shows a communication subsystem 1500 for establishing ATA links between individual UAVs or other airborne platforms in the airborne wireless communication system. The communication subsystem 1500 is used to communicate, exchange data, and relay signals between two or more aircraft. The communication subsystem 1500 provides wireless connections between parts of a distributed communication payload. Thus, each UAV in a functional distributed airborne communication system may need an ATA link equipment.

For example, FIG. 15 shows two UAVs 1510 and 1520 with ATA communication equipment 1515 and 1525 onboard, respectively. Using this equipment, a wireless ATA link 1530 can be established between UAVs 1510 and 1520. The wireless ATA link 1530 may be an RF link at any available open band or frequency, which can be established and supported by a directional RF antenna, included in this example in the ATA communication equipment 1515 and 1525. Because the ATA links are dedicated point-to-point links, much higher antenna gain and a lower transmission loss can be achieved in the ATA links as compared to the ATU links. Therefore, the ATA antennas may be substantially smaller, lighter, and less power consuming than the ATU antennas. Alternatively, the ATA link may be established using a free-space optical (FSO) communication system, which also may be a part of the ATA communication equipment 1515 and 1525. The FSO communication system may use a communication grade laser (e.g., a semiconductor laser operating in the wavelength range of 1300-1600 nm) and a high bit-rate optical receiver. The FSO communication system enables very high bandwidth ATA links, up to 40 Gbit/sec per a single channel, and requires less electrical power for its operation in comparison to the ATA RF antennas. For a given net (combined) communication capacity of the ATU link module, i.e. a first capacity, which is given by the sum of individual ATU sections capacities, an ATA link module may have a net (combined) communication capacity, i.e., a second capacity, that is at least equal to or greater than the first capacity. For example, a system with the 10 Gbit/sec ATU module may require an ATA module with at least 10 Gbit/sec capacity.

Figure 16:
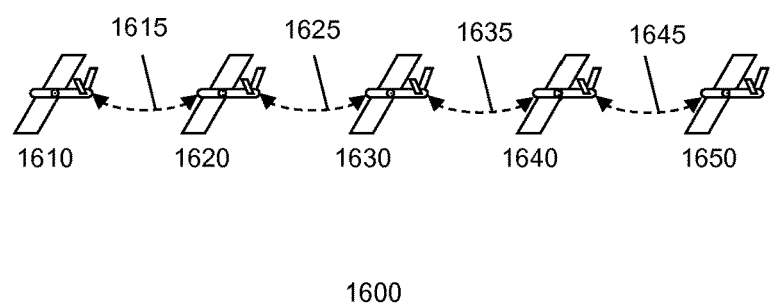
FIG. 16 depicts a schematic view of a UAV fleet as a part of a distributed airborne communication system which includes UAVs that establish ATA links maintained between nearest neighbors in the UAV fleet in accordance with some embodiments of the present invention.

In accordance with embodiments of the present invention, FIG. 16 shows a UAV fleet 1600 as a part of a distributed airborne communication system, which includes UAVs 1610-1650. Using onboard ATA link sections the UAVs 1610, 1620, 1630, 1640, and 1650 establish ATA links 1615, 1625, 1635, and 1645, which are maintained between the nearest neighbors in the UAV fleet. As a result, a signal from the UAV 1610 can be relayed from platform to platform to the UAV 1650 via several ATA links 1615, 1625, 1635, and 1645. Alternatively, additional direct ATA links may be established if necessary, for example between UAVs 1610 and 1640 to shorten the signal relay path. ATA links may be used for short range (<1 km), medium range (1-10 km) and long range (>10 km) signal transmission. In the latter case, they may serve as an alternative to ground-based transmission lines, especially in situations where there is no existing ground-based communication infrastructure or it is cost prohibitive to create a ground-based communication infrastructure. ATA links may be intermittent, i.e., they may be established and maintained on as needed basis, or they may be permanent depending on the network configuration. Due to respective motion of the aircraft with respect to each other, some or all ATA links may require continuous active tracking and/or realignment. In order to simplify this, UAVs in a pair involved in the ATA link may maintain different altitudes and/or fixed relative positions to simplify the ATA link tracking and maintenance.

Figure 17:
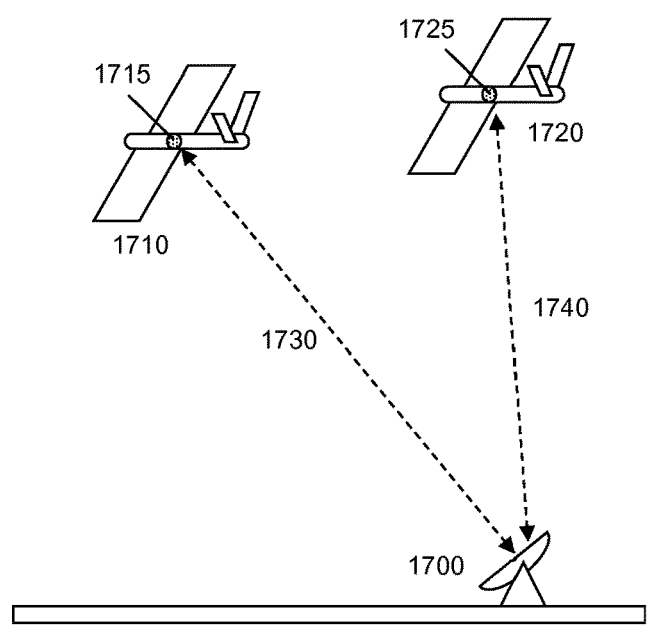
FIG. 17 depicts a schematic view of a ground-based gateway station used to establish broadband communication channels with a UAV fleet in accordance with some embodiments of the present invention.

In some embodiments, as shown in FIG. 17, a ground-based gateway station 1700 may be provided and used to establish broadband communication channels with the UAV fleet above. For this purpose, the gateway station 1700 may rely on RF, microwave, and/or optical wireless links, which can be supported by RF antennas, microwave antennas, and/or FSO apparatus. In addition to antennas and FSO apparatus, the gateway station 1700 may include a network operations module for monitoring and controlling distributed communication payload onboard of the UAV fleet, a communication interface for connecting to wired networks (for phone, data and others) on the ground, and facilities to house and maintain all station's hardware and equipment. The UAV fleet may include one or more UAVs, such as UAVs 1710 and 1720 shown in FIG. 17. The UAVs 1710 and 1720 may carry ATG communication sections 1715 and 1725 as parts of their shared communication payload. The ATG communication sections may also comprise RF antennas, microwave antennas or FSO apparatus for establishing ATG links 1730 and 1740 respectively with the gateway station 1700. ATG links may be operated as fixed point-to-point links using either high-gain directional antennas or FSO apparatus. The ATG links 1730 and 1740 may utilize the RF spectrum outside the frequency range used for ATU communication links to avoid interference, e.g., in the range of about 5 to about 100 GHz. These links in this case may be operated either at the same frequency (using spatial diversity to differentiate between different UAVs) or at different frequencies. In either case, a larger carrier frequency typically provides a larger communication bandwidth for ATG links. FSO-based ATG links may achieve even larger communication bandwidths (up to 40 Gbps) under suitable weather conditions (i.e., absence of cloud cover). The ATG link module may have a net communication capacity (a third capacity) that is at least equal to or greater than the net communication capacity of the ATU link module (the first capacity)). For example, a system with the 10 Gbit/sec ATU module may have an ATG module with at least 10 Gbit/sec capacity.

Figure 18:
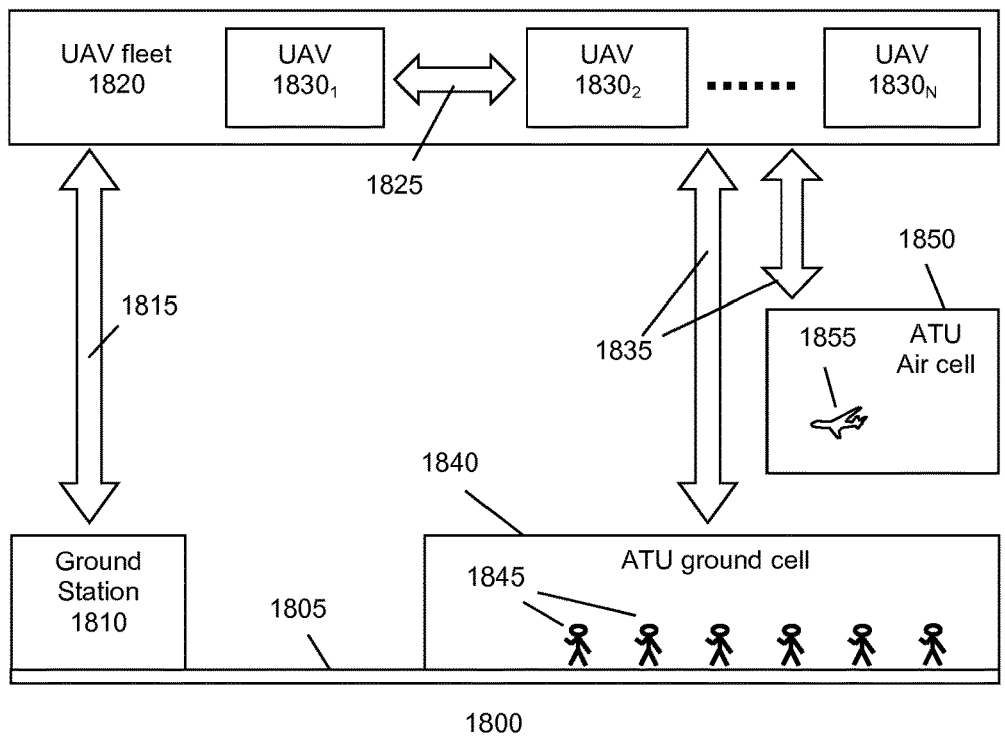
FIG. 18 depicts a schematic view of an airborne wireless broadband communication system in accordance with some embodiments of the present invention.

In accordance with embodiments of the present invention, FIG. 18 shows an airborne wireless broadband communication system (communication system 1800), comprising a gateway base station 1810, a fleet of airborne communication platforms (UAV fleet 1820), and communication cells (ATU ground cell 1840 and ATU air cell 1850). The gateway base station 1810 may be located on the ground 1805 and establish an ATG link 1815 with the UAV fleet 1820, which in turn may be composed of several UAV platforms $1830_1$-$1830_N$, where N is the number of UAV platforms in the UAV fleet 1820. The UAV platforms may establish ATA links 1825 between each other to relay communications in the system. Furthermore, the UAV fleet 1820 establishes an ATU link 1835 to an ATU ground cell 1840 and an ATU air cell 1850 below. The ATU link 1835 enables one-way and two-way communications with the end-users 1845 located in the ATU ground cell 1840 or airborne end-users 1855 in the ATU air cell 1850. Gateway base station 1810, UAV platforms 1830, and end-users are the main nodes in the network provided by the communication system 1800. The signals received from the end-users may be relayed through the UAV fleet 1820 to the gateway base station 1810, which in turn forwards them to the signal routing center that determines its final destination. The routing center may be co-located with the gateway base station 1810. Similarly, the signals originating at the routing center may be relayed through the gateway base station 1810 to the UAV fleet 1820, which finds the corresponding ATU cells and forwards the signals to the appropriate end-users located there. The signal path may also be shortened in some situations by bypassing some nodes in this network. For example, if the communication is between end-users in the same ATU cell or the cells supported by the same UAV fleet, the communication path may avoid the gateway station, so that the signal may transit more directly and only through the UAV fleet portion of the network.

The communication system 1800 may be modified to include multiple gateway station to increase system capacity. These gateway stations may be positioned in different locations on the ground and elsewhere in order to diversify the network design and avoid inter-channel interference between different stations and corresponding ATG links. Different stations may link to different airborne platforms to shorten the signal path, or to the same airborne platforms to increase information transfer rate and capacity. Multiple ATU cells (both on the ground and in the air) may be produced by the UAV fleet. Some of the cells may cover the area in which the gateway stations are located. Different user types inside the communication cells may be serviced by the communication system 1800, including (1) individuals via personal mobile communication devices, such as mobile phones, tags and wearable electronics, (2) autonomous vehicles, such as driverless cars and various UAVs equipped with wireless mobile transceivers, (3) ground vehicles with fixed wireless communication apparatus, (4) piloted aircraft, (5) fixed and mobile ground-based transceivers for commercial, government, municipal, civil, military, emergency and many other uses.

Figure 19:
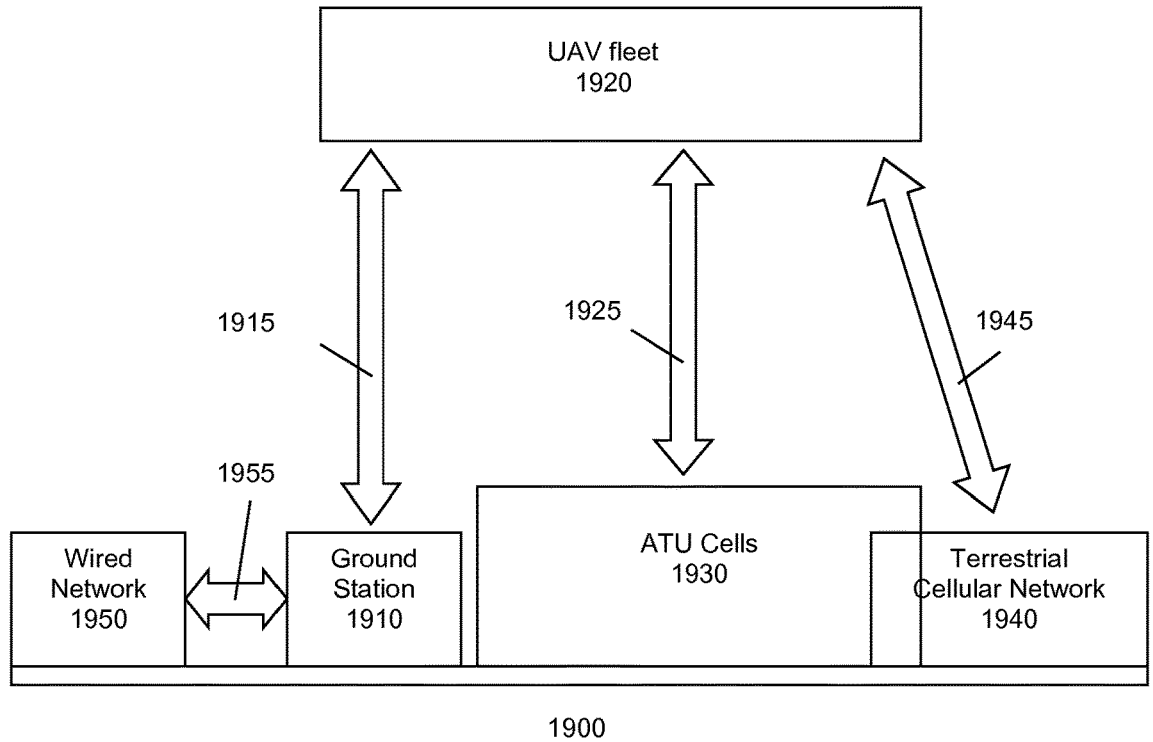
FIG. 19 depicts a schematic view of a communication system which includes a ground station, a UAV fleet, and a region with ATU cells in accordance with some embodiments of the present invention.

In another embodiment of the invention shown in FIG. 19, a communication system 1900 is provided, which includes an airborne portion comprising a ground station 1910, a UAV fleet 1920, and a region with ATU cells 1930. The airborne portion may function in a similar way to that described above for the communication system 1800. In addition, there may be additional ground-based segments of the communication system 1900, including terrestrial wireless and wired networks. For example, a terrestrial wireless cellular network 1940 may be a part of the communication system 1900, where it provides an area coverage at least partially overlapping with the ATU cells 1930. In these overlapping areas both services (airborne and terrestrial) may co-exist and provide communication channels to end-users on a co-primary basis. In addition, the UAV fleet 1920 may establish wireless air-to-tower (ATT) links 1945 for direct communications between the airborne and terrestrial segments (e.g., as serviced by cell towers, or cellular communication towers) of the communication system 1900. Furthermore, a wired broadband network 1950 may also be part of the communication system 1900, which are interconnected via a broadband wired link 1955, as shown in FIG. 19. This network allows end-users to access internet, connect to other remote networks and communicate with other users serviced by other communication systems. Among other things, the communication system 1900 also allows, for example, to provide additional (ground-based) connection paths to the terrestrial phone networks, such as the terrestrial wireless cellular network 1940.

Figure 20:
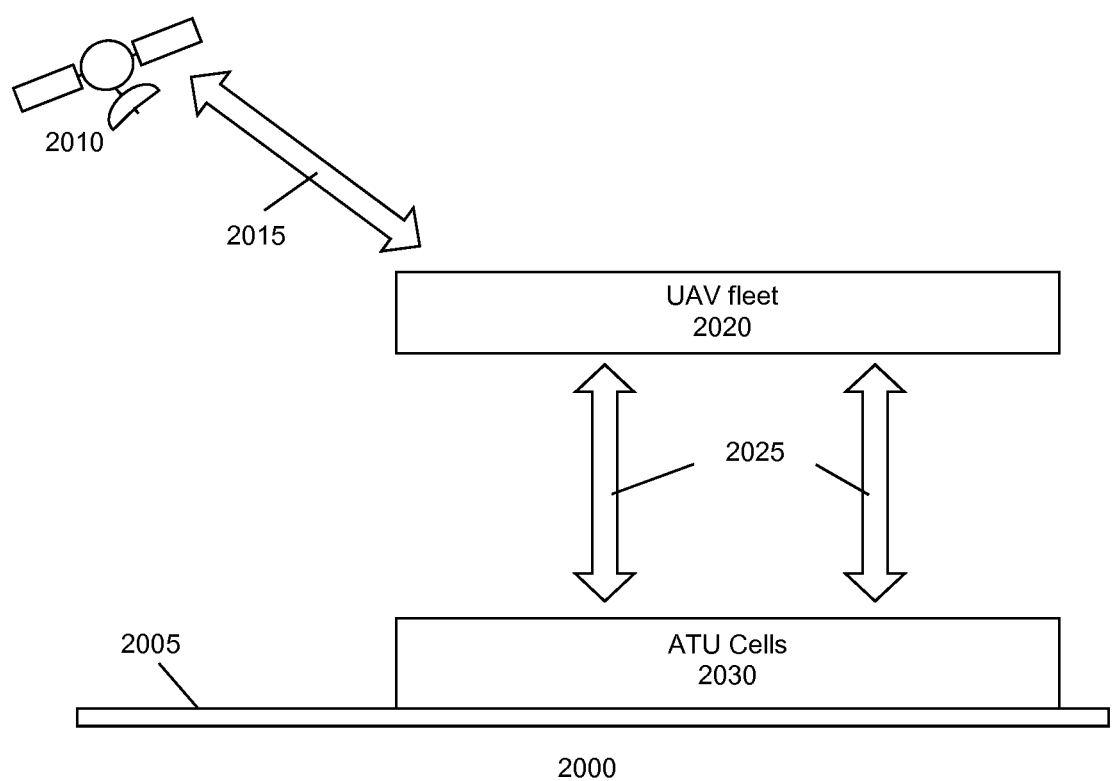
FIG. 20 depicts a schematic view of a communication system which includes a communication satellite, a UAV fleet, and a region mapped with ATU cells in accordance with some embodiments of the present invention.

In some embodiments of the invention, and as shown in FIG. 20, a communication system 2000 is provided, which includes a communication satellite 2010, a UAV fleet 2020, and a region mapped with ATU cells 2030. The communication satellite 2010 is a space-based gateway station, which performs functions in this system similar to those for the ground-based gateway stations described above. The communication satellite 2010 may orbit the Earth as a part of a larger satellite network, comprising many communication satellites, some or all of which may also be able to function as gateway stations. The UAV fleet 2020 may be able to form air-to-space (ATS) links 2015 using microwave and RF antennas in the frequency range allocated to the satellite communications. The UAV fleet may also be able to provide ATU links 2025 and service ATU cells 2030 underneath. In some embodiments, a communication system can include both ground-based and space-based gateway stations, as described herein, and which are capable of establishing additional communication links between themselves. This may enable introduction of such communication networks and systems into world regions, where wired communication network infrastructure does not exist.

Figure 21:
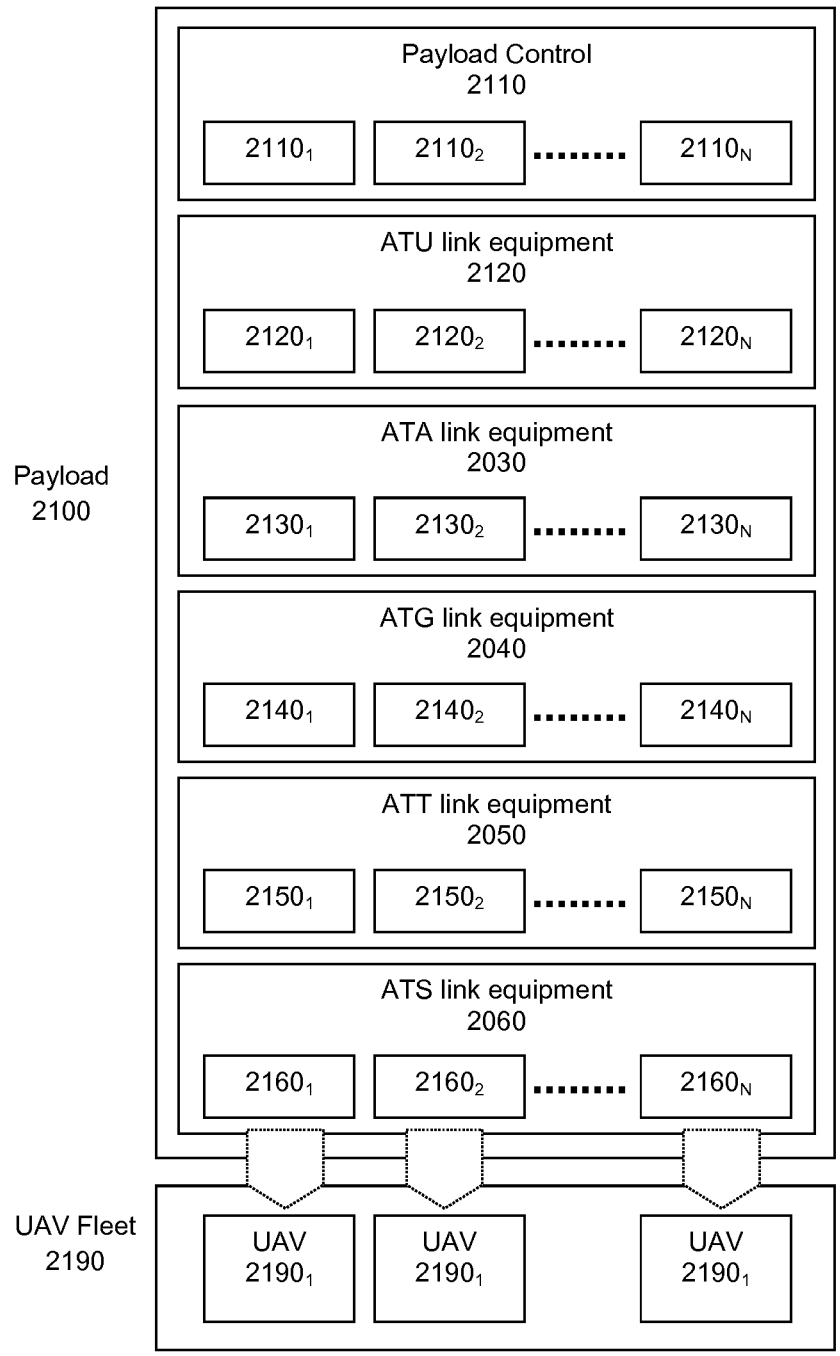
FIG. 21 depicts a schematic view of a distributed airborne communication payload for a UAV fleet in accordance with some embodiments of the present invention.

In accordance with embodiments of the present invention, FIG. 21 shows a distributed airborne communication payload (payload 2100) for a UAV fleet 2190. In general, the payload 2100 may segmented into functional payload segments, which include payload control and management electronics 2110, ATU link equipment 2120 (e.g., ATU link module), ATA link equipment 2130 (e.g., ATA link module), ATG link equipment 2140 (e.g., ATG link module), ATT link equipment 2150 (e.g., ATT link module), and ATS link equipment 2160 (e.g., ATS link module). Some of the functional payload segments may be optional, such as for instance the ATT link equipment 2150 and ATS link equipment 2160. Some or all of the functional payload segments may in turn be subdivided into smaller sections: for example, the ATU link equipment 2120 may be subdivided into X parts, referred to as ATU link equipment $2120_1$-$2120_X$, where X is in the range of 1 to N (and N is the number of UAVs in the UAV fleet 2190).

The subdivided, smaller sections of the functional payload segments may be distributed and mounted onto the individual UAVs in the UAV fleet 2190. For example, each functional payload segment may be divided into N equal sections and evenly distributed among N UAVs, so that a UAV $2190_i$ contains functional payload sections $2110_i$-$2160_i$ (i ranges from 1 to N). In this case, the UAVs comprising the UAV fleet are similar to each other in capabilities and functionalities, which increases system redundancies and robustness. Alternatively, some or all of the functional payload segments may be unequal and dissimilar in their physical and operational characteristics. As a result, the payload 2100 distribution across the UAV fleet 2190 may be uneven, so that at least some of the individual UAVs may differ from each other in this case. This system design approach allows some of the UAVs to be more specialized and potentially more efficient in performing one or more functions within the airborne communication system, such as transmitting signals; receiving signals; linking with users, gateway stations, and airborne platforms; processing voice, text, network messaging, and data; tracking system status; synchronization and management of individual network elements; and so on.

Figure 22:
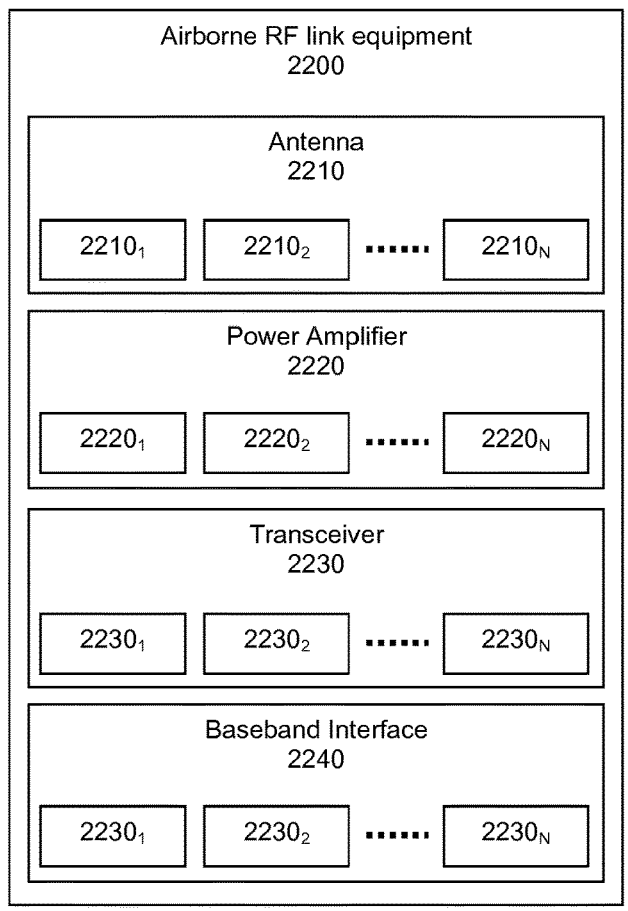
FIG. 22 depicts a schematic view of a distributed communication subsystem which may be used to implement RF-based communication links in accordance with some embodiments of the present invention.

In accordance with embodiments of the present invention, FIG. 22 shows an airborne RF link equipment subsystem 2200, which may be used to implement RF-based communication links describe above. It comprises parts and components that may be included in either ATU link equipment 2120, ATA link equipment 2130, ATG link equipment 2140, ATT link equipment 2150, or ATS link equipment 2160. The airborne RF link equipment subsystem 2200 may include an antenna 2210, a power amplifier 2220, a transceiver 2230, and a baseband interface 2240. As any part of a communication payload, these parts of the airborne RF link equipment subsystem 2200 may be further subdivided into smaller sections (or blocks) as shown in FIG. 22, each one to be carried by an individual UAV. For example, sections $2210_i$, $2220_i$, $2230_i$ and $2240_i$ may be combined into a single segment, such as $2120_i$ (as well as $2130_i$, $2140_i$, $2150_i$, or $2160_i$), and mounted on board of a single UAV, such as UAV $2190_i$, where i ranges from 1 to N. These sections ($2210_i$, $2220_i$, $2230_i$ and $2240_i$) may be wired and interconnected electrically on board a UAV and also connected to its power train subsystem. On the other hand, interconnection and communication between different sections of any segment of the payload located on different UAV platforms (e.g. $2110_1$ and $2110_2$, or $2120_1$ and $2120_2$) may be done wirelessly via ATA links. Although each part of the airborne RF link equipment subsystem 2200 is shown subdivided into equal numbers of smaller sections, different parts of the airborne RF link equipment subsystem 2200 may be subdivided into different numbers of smaller sections or not subdivided at all.

Conventional wisdom in system design is to conserve hardware and reuse components to perform multiple functions in order to make the system more efficient and of simpler design. For example, a communication system with a single phased array antenna is capable of producing multiple RF beams and thus serving multiple communication links (e.g., multiple ATU cells). From any conventional approach, the same system broken into smaller constituent parts with multiple phased array antennas would be less efficient, more complex, and therefore less desirable. However, when considering airborne communication systems, such as those described above, the inventors discovered that conventional rules do not always apply. For example, the inventors find that payload power consumption can be a far more demanding condition and a more difficult specification to meet than the payload weight for the UAV platform. The inventors also find that the payload power consumption depends primarily on the communication system capacity, utilization, and information transfer rate. Therefore, there is little or no penalty on the payload power consumption when such a system is subdivided into smaller parts. Furthermore, even the weight penalty associated with such subdivision is minimized, because the weight of an RF antenna is in part proportional to its RF signal load, i.e., the net RF current produced by its power amplifiers. On the other hand, the inventors find that the benefits of a distributed communication payload far outweigh any drawbacks. When considering the overall efficiency of a combined airborne system, i.e., the payload and the UAV platforms, the efficiency of a fleet of UAVs with a distributed payload exceeds the efficiency of a single UAV with a solitary payload. This comes as a result of a scaling law for large aircraft (or any other 3-dimentional object), stating that the weight of a UAV tends to be proportional to the third power of its size. On the other hand, the weight of a UAV fleet is linearly proportional to the number of UAVs. Consequently, for the same capacity the weight of a single-UAV-based communication system is much larger than the weight of a UAV-feet-based communication system. Therefore, the latter is more efficient and more advantageous for airborne communications.

Figure 23:
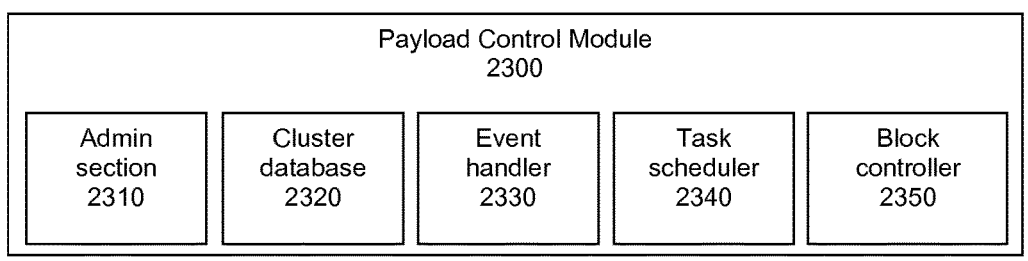
FIG. 23 depicts a schematic view of a payload control subsystem for a distributed airborne communication system in accordance with some embodiments of the present invention.

Although a distributed payload may be physically located on board of different airborne platforms, from the network standpoint it still represents a single network component, e.g., a single node. The end-users and network operators interact with a whole UAV fleet and its communication payload, rather than individual components. They see a single interface and a single system image, as if the distributed payload is a single entity, and consequently they are unable to distinguish its constituent parts, i.e., any subdivisions in the payload. To accomplish this task, the payload control electronics internally manage and coordinate the operations of each payload component by using specialized computer cluster middleware. FIG. 23 shows a payload control module 2300, which may include control sections: an administration section 2310, a cluster database 2320, an event handler 2330, a task scheduler 2340, and a block controller 2350. The block controller 2350 controls blocks (i.e., sections) of other payload modules, e.g., a section of an ATU link module. Such a payload control module is a subsystem similar to a computer cluster in that it has several distinct and separate hardware parts (akin to computer nodes), that are run by a distributed algorithm software and working together synchronously or asynchronously on shared tasks. The administration module 2310 enables real time monitoring of payload modules and full access to the software and data loaded on control module sections. The cluster database 2320 stores, provides, and continuously updates various data types necessary for airborne communication payload operations, such as cellular mapping data, end-user positioning, gateway positioning, individual UAV positioning, subsystem statuses, and so on. The event handler 2330 provides asynchronous subsystem control capabilities, where any subsystem may request attention for a service at any time, e.g., in an event of a malfunction or a software-triggered conflict. The task scheduler 2340 may be used to manage available resources for all onboard subsystems, schedule and synchronize various tasks, and provide statistical analysis and prediction for future resource allocations. The block (i.e. section) controller 2350 may be used to micro-manage the operations of individual sections and subsystems. All or some of the control modules may operate in parallel.

Figure 24:
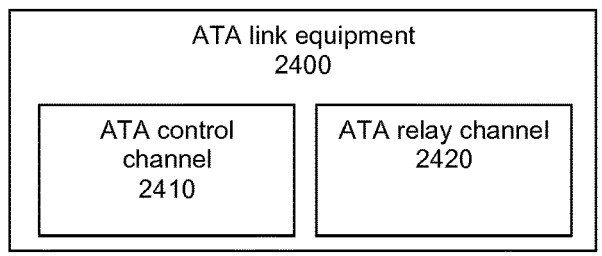
FIG. 24 depicts a schematic view of a schematic view of ATA link equipment subdivided into two sections for internal and external communications, respectively, in accordance with some embodiments of the present invention.

The distributed payload operations also require communication channels dedicated to internal communications between individual UAVs. Such a channel (or multiple such channels) may be supported by the ATA link equipment. Thus, the ATA link equipment may be also subdivided into two segments—each for internal and external communications, respectively, as shown in FIG. 24. The ATA subsystem 2400 comprises at least two segments: an ATA control channel 2410 and an ATA relay channel 2420. The ATA control channel 2410 serves the internal needs of the payload control module 2300, by providing fast, broadband communications links between control sections on different UAVs, i.e., cluster elements. The ATA control channel enables the distributed computing operation of the payload control module 2300 as a whole and its different segments and sections. The ATA relay channel 2420 serves as a conduit for all external network traffic between platforms within the UAV fleet, which includes text messaging, phone calls, data transfers, internet browsing, video and radio streaming, broadcasting, multicasting and so on. The ATA relay channel 2420 may require a substantially broader communication bandwidth than the ATA control channel 2410 to accommodate all network traffic transiting trough the network. The two channels may be operated completely separate from each other, for example by using different RF ranges or by using different types of ATA links, such as radio links for the ATA control channel and FSO links for the ATA relay channel.

The ATA control channels enable formation of an airborne local area network cluster, where the cluster elements include individual sections of the payload control module. The internal network architecture of such a cluster may be either centralized or decentralized. In the former case, the configuration of internal wireless connections between cluster elements is fixed, so that internal signal routing and messaging is managed by one or more payload control sections, i.e., a network controller (e.g., an administration section 2310). In the latter case, the airborne cluster may adopt an ad hoc network configuration, in which each cluster element may take part in signal routing, resulting in a much more dynamic architecture. Both approaches have their advantages. The centralized cluster operation may reduce response time and increase system capacity. On the other hand, the decentralized cluster operation may increase system redundancy and reliability.

Figure 25:
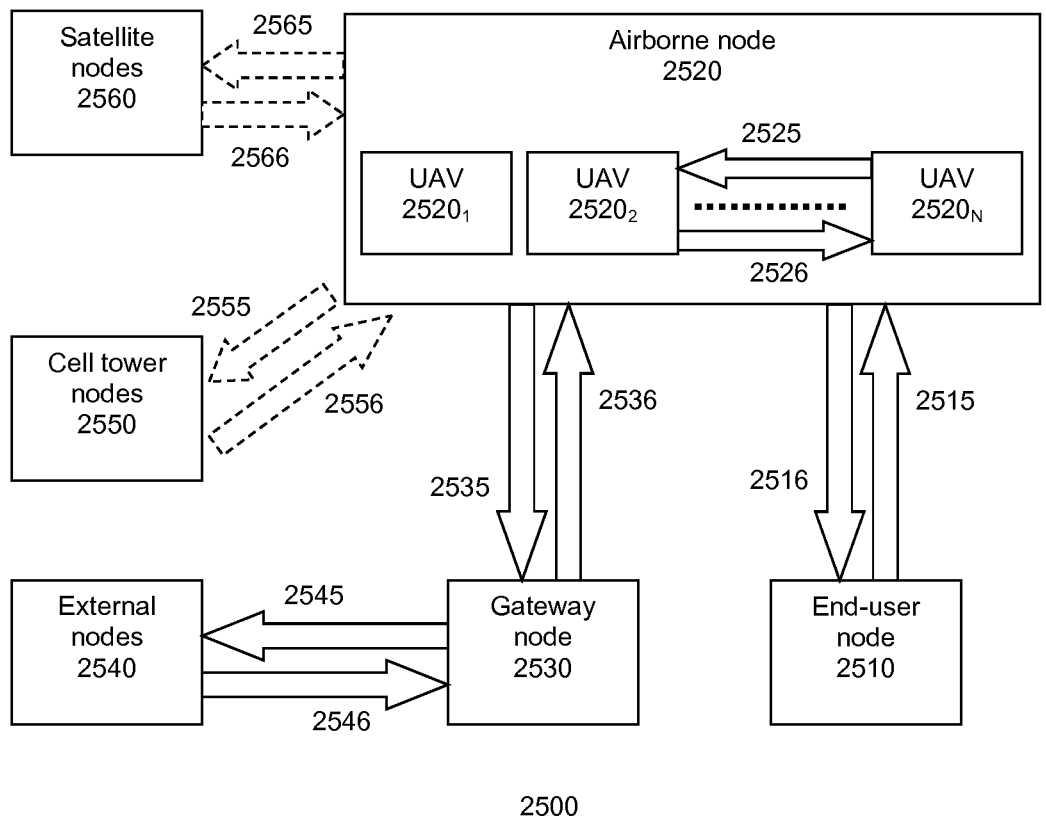
FIG. 25 depicts a schematic view of a distributed airborne communication network comprising an end-user node, an airborne node, a gateway node, an external node, a cell tower node, and a satellite node in accordance with some embodiments of the present invention.

In accordance with embodiments of the present invention, FIG. 25 shows a distributed airborne communication network 2500 comprising several nodes: an end-user node 2510, an airborne node 2520, a gateway node 2530, an external node 2540, a cell tower node 2550, and a satellite node 2560. The cell tower node 2550 and the satellite node 2560 may be optional, as indicated by the dotted arrows.

Several network configurations are possible, in which some of these nodes may be absent or some of these nodes may be present in quantities greater than one. For example, a minimum successful distributed airborne communication network requires only two nodes: the end-user node 2510 and the airborne node 2520. On the other hand, larger networks may include multiple end-user nodes, airborne nodes, gateway nodes, and others. The end-user nodes may be based on the ground, in the air space, or both. The communication flow in the distributed airborne communication network 2500 may occur as follows. A signal from the end-user node 2510, e.g., a cell phone, is transferred via a wireless link 2515 to the airborne node 2520. The airborne node 2520 relays the signal to the gateway node 2530 via a wireless link 2535, which then forwards it to the external node 2540 via a wired connection 2545. The external node 2540 provides an interface with external networks, which may route the end-user signal to its final destination (in this scenario outside the distributed airborne communication network 2500). Upon receiving a response, another signal may be forwarded in the opposite direction as follows. The external node 2540 using a link 2546 transfers the response signal to the gateway node 2530, which in turn sends it to the airborne node 2520 via a link 2536. The airborne node 2520 then finds the end-user and forwards the signal to the end-user node 2510 via a link 2516. Of course, both of these transfer processes may occur simultaneously without interference from each other. Although the internal operations of the airborne node 2520 are opaque and invisible to the end-user, they involve additional signal transfers via wireless links 2525 and 2526 between individual UAV platforms $2520_1$, $2520_2$, ... and $2520_N$, where N is the number of UAVs in the airborne node 2520.

Figure 26:
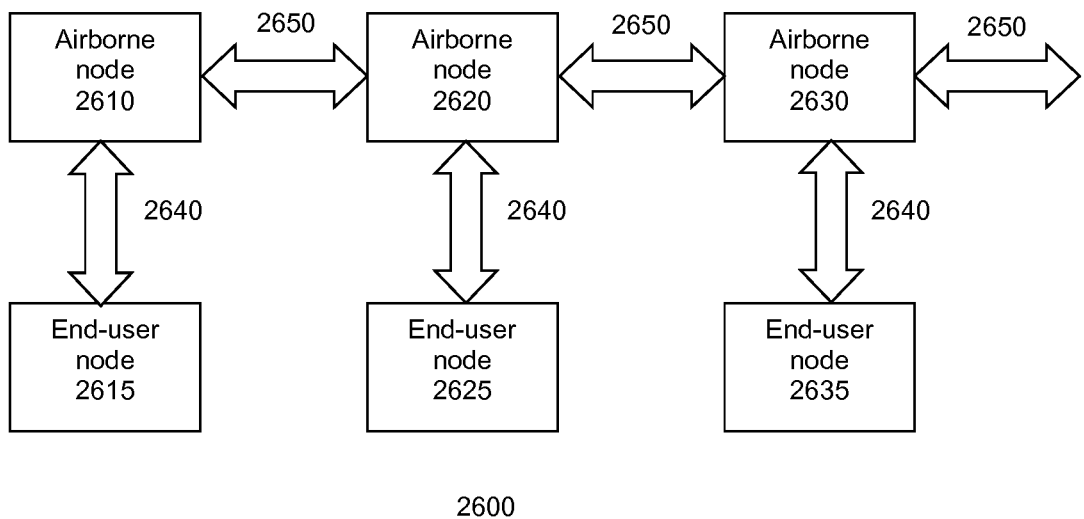
FIG. 26 depicts a schematic view of a distributed airborne communication network comprising a multitude of airborne nodes, and a multitude of end-user nodes, in accordance with some embodiments of the present invention.

In accordance with embodiments of the present invention, FIG. 26 shows a distributed airborne communication network 2600 comprising several nodes: a plurality of airborne nodes 2610, 2620, and 2630, and a plurality of end-user nodes 2615, 2625, and 2635. Of the plurality of end-user nodes 2615, 2625, and 2635, at least one end-user node may be ground-based and at least one end-user node may be airspace-based). The nodes are interconnected by ATA links 2650 and ATU links 2660. The airborne nodes are provided by different distributed communication payloads carried by different UAV fleets. The ATA links 2650 are used to interconnect the UAV fleets, payloads, and associated nodes similarly to the way individual UAVs are linked within a fleet. The ATU links 2660 provide end-user links in end-user node areas assigned to the respective airborne nodes as described above. The number of end-user nodes associated with an airborne node may be greater than one. Also, the number airborne nodes in the distributed airborne communication network 2600 may be any number greater than one (i.e., not just three nodes shown in FIG. 26). The airborne nodes may be similar to each other, or alternatively may be different in size, number, altitude, endurance, capabilities, and so on. Similarly, the end-user nodes may also be different from each other in their scope, size, and shape, which in general depends on the ground terrain, population density and distribution, roads and traffic patterns, end-user types, etc.

Airborne node operations, i.e., the operations of a distributed communication payload on board of a UAV fleet, may be optimized by providing a degree of functional division among its constituent components and associated UAV platforms. Such a division or specializations among different UAVs in a fleet may be reflected in their hardware, software, or both. On the hardware side, UAVs may differ in their airframes, power systems, propulsion systems, payload contents, payload design, or payload distribution and location. On the software side, even UAVs with identical hardware design and payload composition may differ in software content and the types of functions they specialize within the fleet. Different UAV specializations may be attractive for optimization of the airborne node operations, such as receiver UAVs, transmitter UAVs, relay UAVs, master UAVs, slave UAVs and so on. Functional subdivision is possible not only in the physical layer of the airborne network, but also in its logical layers. Some UAVs may specialize in organizing transport layers, network routing, data packaging, etc. Optionally, one or more UAVs may perform one or more base station functions, e.g., by enabling direct signal routing between end users in the same service area without passing through a gateway station. Consequently, various airborne node topologies may be possible if its constituents can be specialized in one or more functions.

Figure 27:
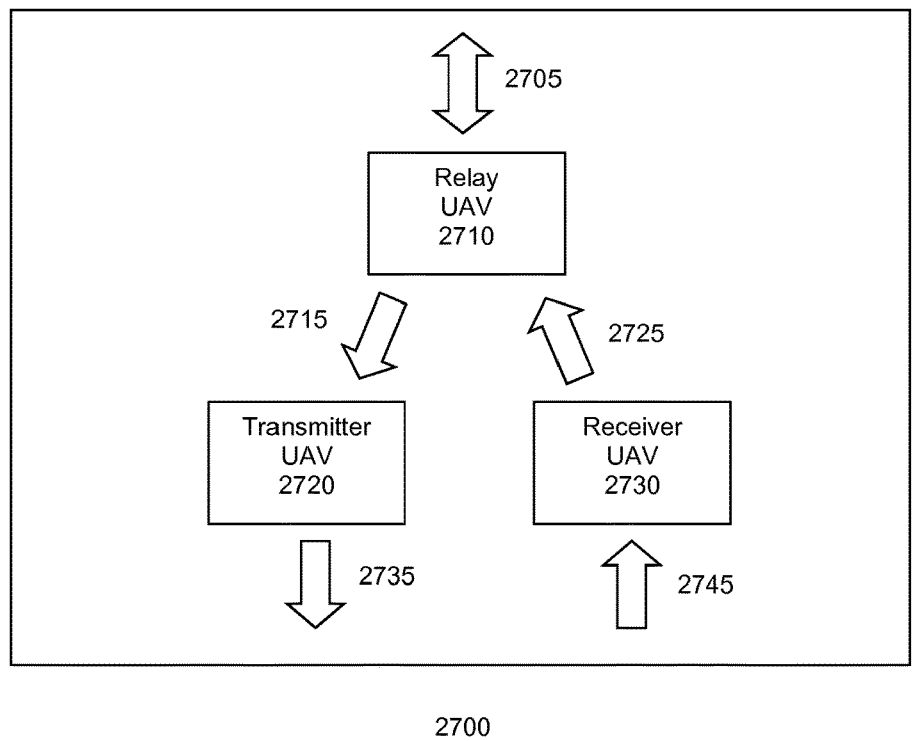
FIG. 27 depicts a schematic view of an airborne node design topology which includes three types of payload bearing UAV platforms: a relay platform, a transmitter platform, and a receiver platform, in accordance with some embodiments of the present invention.

In accordance with some embodiments of the present invention, FIG. 27 shows an airborne node design topology 2700, which includes three types of payload bearing UAV platforms: a relay platform 2710, a transmitter platform 2720, and a receiver platform 2730. The relay platform 2710 comprises a section of the communication payload, which interfaces other UAVs, fleets of UAVs, gateway stations and other external nodes, and relays signal between them via wireless links 2705, 2715, and 2725. The transmitter platform 2720 comprises a section of the communication payload, which defines a communication cell on the ground and in the air below and transmits signals to the end-user inside the cell via a wireless link 2735. The receiver platform 2730 comprises a section of the communication payload, which also defines a communication cell on the ground and in the air below and receives signals from an end-user inside the cell via a wireless link 2745. The communication cells defined by the transmitter platform 2720 and the receiver platform 2730 may be the same in size and shape and cover the same geographical area. Alternatively, they may be different from each other. In this case, for example a receiver cell may be twice the size of the transmitter cell, so that an airborne cell may include two transmitter platforms and one receiver platform with the combined size of the two transmitter cells equal to the size of the receiver cell.

Figure 28:
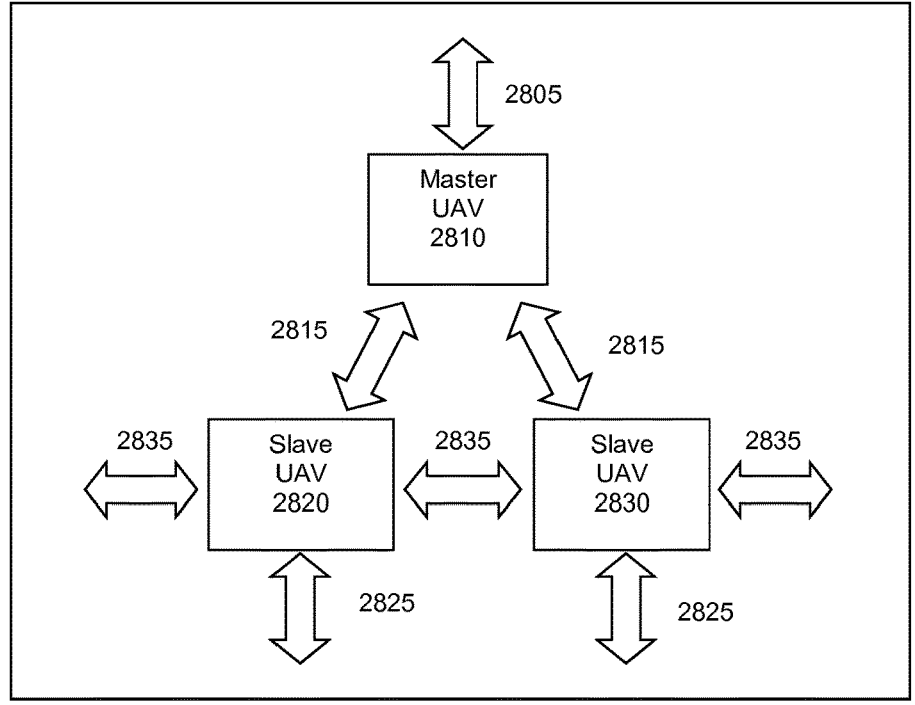
FIG. 28 depicts a schematic view of an airborne node design topology which includes two types of payload bearing UAV platforms: a master platform and a plurality of slave platforms, in accordance with some embodiments of the present invention.

In accordance with some embodiments of the present invention, FIG. 28 shows another airborne node design topology 2800, which includes two types of payload bearing UAV platforms: a master platform 2810 and a plurality of slave platforms (only slave platforms 2820 and 2830 are shown in FIG. 28). The master platform 2810 houses the major portion of the payload control module (i.e., a master section of the distributed communication payload) that manages and operates the slave platforms (each having slave sections of the distributed communication payload). The slave platforms, such as slave platforms 2820 and 2830, may contain the majority of the ATU, ATA, and ATG equipment sections. The master platform 2810 communicates directly with network operators via a wireless link 2805 and controls the slave platforms 2820 and 2830 via links 2815. The slave platforms 2820 and 2830 may communicate with end-users and among themselves using ATU links 2825 and ATA links 2835, respectively. This design approach may be attractive, because it simplifies the software necessary to run both the master and slave portions of the payload control module, and it also may simplify the airborne network design and its maintenance.

The airborne node topology may be flexible, adjustable and reconfigurable. The same UAV may be able to perform different functions, so that it may play different roles in the node. For example, the same UAV may be able to function as either a receiver UAV, a transmitter UAV or both. This can be accomplished by using for example multi-purpose payload modules, sections, and general subsystems, such as an RF antenna configurable to operate in both transmitter and receiver modes. The particular role this UAV plays in any given node may be chosen at random, depending on many factors including the overall node topology, UAV statuses, channels loading, weather and so on. In addition, the overall node topology may be changed depending on these factors and decisions of network operators. For example, the size of the node and its capacity may be increased by adding more UAVs in response to increased demand. New frequency bands and communication capabilities may be added by incorporating additional UAVs with specialized equipment and functionality. Upgrades and repairs can be made on individual UAVs without bringing the whole fleet down. A special loitering fleet of back-up UAVs may be used in the vicinity of operating airborne nodes to shorten the response time in case of emergency or sudden jumps in communication traffic. Also, the node topology may be changed without changing the number of UAVs in the fleet, by reassigning the roles of individual UAVs, e.g., in switching from the airborne node design topology 2700 to the airborne node design topology 2800.

In regard to the airborne node design topology, the inventors also note that the distributed payload approach enables network providers to better match the network capacity to the existing demand from end-users by managing channel loading. The customer demand for communication bandwidth, i.e., the information transfer rate, varies from day to day, hour to hour. For example, this demand typically peaks during daytime and decreases at night. When the demand decreases the airborne system enters the regime of substantial overcapacity. It is advantageous for an airborne system to reduce its capacity in order to maintain operational efficiency and maximize system endurance. Because the power consumption of idling hardware or hardware operating at low loads is still substantial, it is attractive to completely shut down some sections or subsections of the system, such as high-power RF transceivers, while operating at high channel loading and close to maximum capacity on remaining sections. For example, a fleet of 10 UAVs with 10 ATU antennas may be able to operate more efficiently at night with only five working antennas at any given time. This approach allows five other UAV to completely shut down their payload sections to conserve power. These UAVs may alternate their roles by for example changing their statuses between active and inactive every hour and thus improve overall system efficiency. The number of UAVs in the fleet above was used only for illustration; this principle can be applied to a fleet with any other number of UAVs greater than one. It is also possible to do the reverse, where upon increase in traffic the UAV fleet may grow in size by bringing in additional payload-bearing aircraft. The additional UAVs may be brought in from other fleets, idling back-ups, and the ground base.

Figure 29:
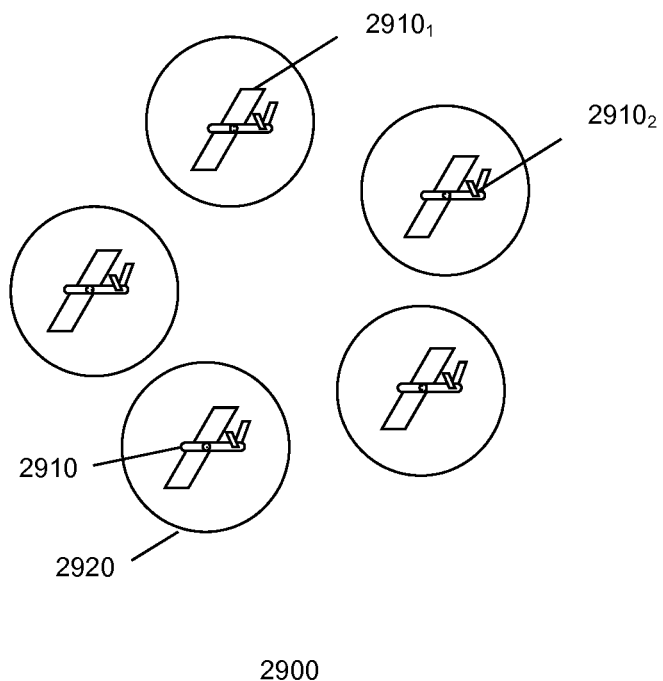
FIG. 29 depicts a schematic view of a UAV fleet comprised of a plurality of UAVs in accordance with some embodiments of the present invention.

Operations of a distributed airborne wireless system also require careful flight control of a fleet of airborne platforms. In accordance with embodiments of the present invention, FIG. 29 shows a UAV fleet 2900 comprised of 5 UAVs 2910. Of course, a UAV fleet may contain any number of aircraft greater than one. In addition to its payload, each UAV 2910 has dedicated flight control electronics (see, e.g., flight control electronics 310 in FIG. 3). One of its functions is to provide each UAV with situational awareness and prevent mid-air collisions between different UAVs inside the fleet. The UAV flight control electronics establish a protective region 2920 (i.e., a virtual bubble) around the UAV, which is considered off limits to other aircraft. The region may be established for example using specialized software and UAV's GPS data; the software then may broadcast the protective region's coordinates to the fleet members for collision avoidance. In addition, the flight control module may include proximity sensors to further improve collision avoidance capabilities against malfunctioning UAVs and flying objects outside of the UAV fleet.

The flight patterns of each UAV 2910 in the UAV fleet 2900 may be similar to or different from each other. Each UAV may have a preloaded flight plan that describes in details the flight trajectory it has to follow. The flight may be updated periodically from the ground by network providers or modified autonomously by the flight control and payload control electronics. The flight plan may be the same for each UAV, so that the UAVs may fly together synchronously and maintain the same speed and distances from each other. This approach simplifies ATA link maintenance and payload synchronization across the fleet. Alternatively, the flight plans may be different and subject to change for each UAV, which improves system robustness and reduces its sensitivity to external perturbations (e.g., rough weather, turbulence, etc.). The flight plan may include circling and hovering in the air space above the designated communication cells. Thus, the cell boundaries may define the boundaries of the UAV flight plan. In tight fleet formations with very closely spaced UAVs, a special synchronized flight pattern may be used that may be controlled from a master flight controller on board of a master UAV platform.

The flight paths of some or all of the UAVs 2910 may be planned in such a way that at least some of these UAVs may be able fly in the air stream wake of other UAVs within the fleet 2900. For example, the UAV 2910$_2$ may be able to fly behind the UAV 2910$_1$ in sufficient proximity to reduce aerodynamic drag and increase lift of its airframe, while reducing propulsion power necessary for maintaining a level flight. This effect is made possible by the tip vortices produced by the forward UAV 2910$_1$. It is known from flight patterns and formations used by birds and fish that 15% or more of mechanical energy can be conserved in such a way. Similarly, UAV formations of two or more aircraft may be used to conserve energy and substantially reduce power requirements in long endurance flights. The UAV flight pattern and formation may be either persistent, i.e. substantially unchanging over long periods of time (hours, days, weeks, or months), or intermittent, i.e., varying and adaptable to specific environmental conditions, working situations and fleet statuses. In the latter case, for example, one or more formation flight patterns may be used only at night or during winter solstices, when power conservation is most important. Alternatively, there may be at least two different flight formations each optimized for day and night time operations, respectively.

Figure 30:
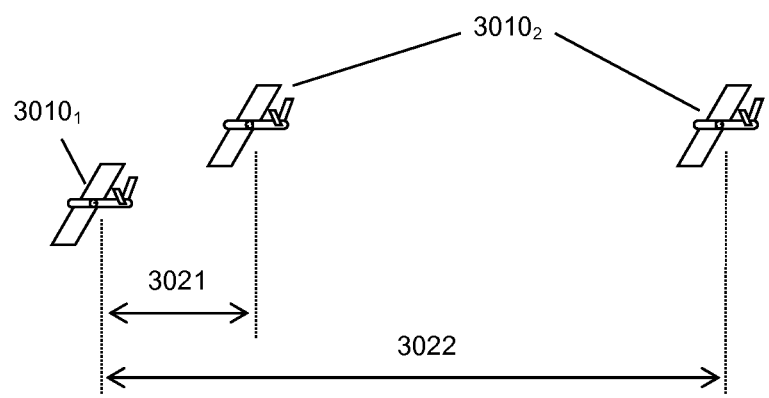
FIG. 30 depicts a schematic view of a flight formation pattern for a UAV fleet in accordance with some embodiments of the present invention.

Flight power reduction may be achieved when at least two UAVs are flying close to each other as shown in FIG. 30. The UAV 3010$_1$ produces a wake behind its wing tips, which may be used by the UAV 3010$_2$ for flight power reduction. Both UAVs may be substantially within the same horizontal plane, although the effect may still be observed even with some vertical offset between the UAVs. Also, the tail UAV 3010$_2$ may be laterally offset with respect to the front UAV 3010$_1$, as shown in FIG. 30. The effect may be observed and used over a range of distances between the two UAVs. The shortest distance 3021 is in part determined by the aircraft safety range, e.g., the protective region 2920 in FIG. 29, the onboard flight control electronics capabilities, e.g., the autopilot specifications, and other factors. The longest distance 3022 is determined by the wake size and strength. Both distances can be measured in terms of the UAV's wing span. For example, the shortest safe distance may be equal approximately one wing span, while the longest distance may be equal to a few tens (e.g., about 10-50) of the UAV's wing spans.

Figure 31:
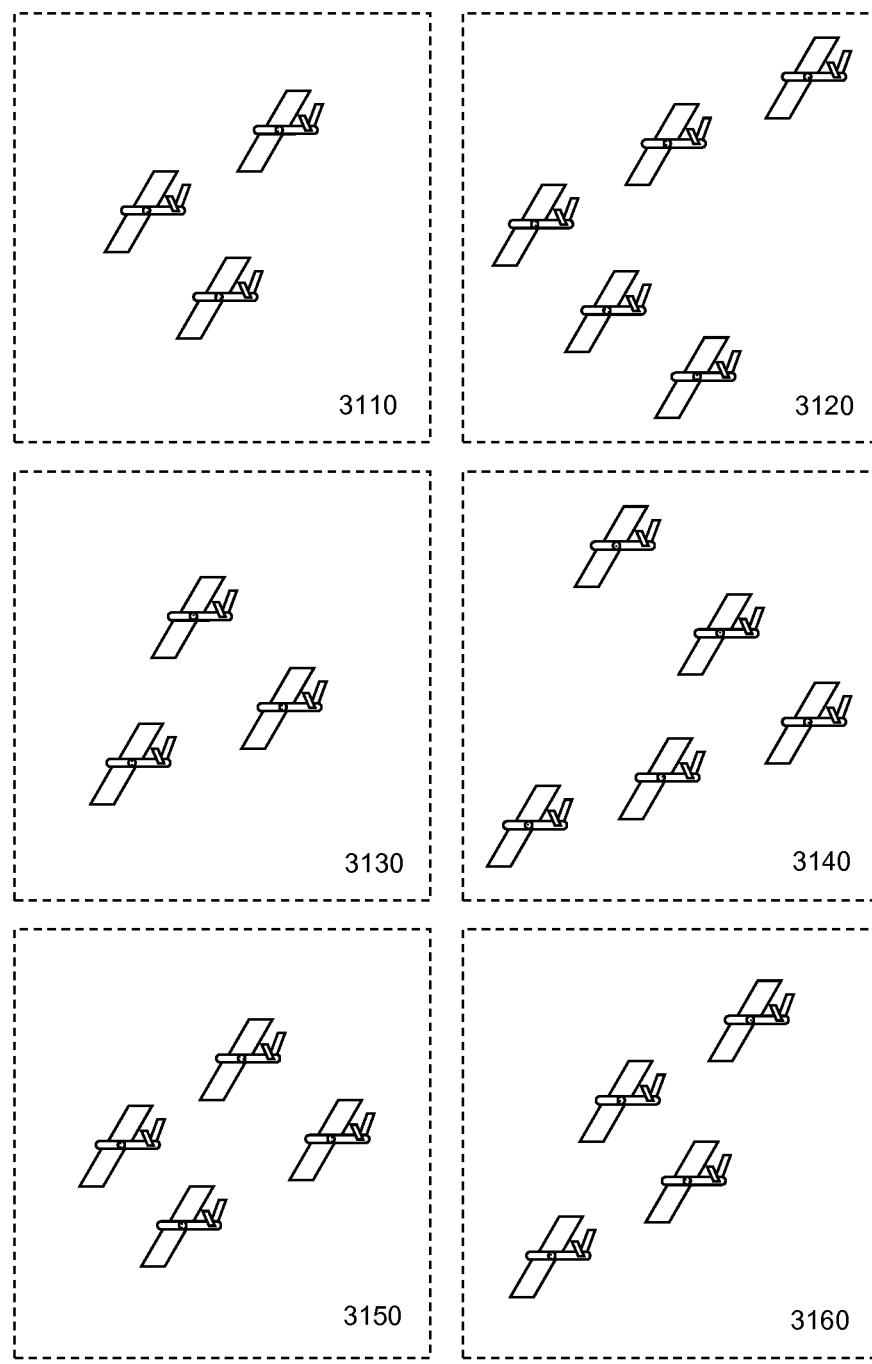
FIG. 31 depicts a schematic view of a several flight formation patterns for UAV fleets in accordance with some embodiments of the present invention.

FIG. 31 shows a few other examples of flight formation patterns for UAV fleets. Formations 3110 and 3120 are V-shaped formations of different sizes (with 3 and 5 UAVs respectively), in which the wake of a leading UAV is used by one or more tailing UAVs. Formations 3130 and 3140 are inverted V-shaped formations, in which a tailing UAV may use at least two wakes from leading UAVs. This way it is possible to significantly reduce propulsion power consumption of the tailing UAVs by at least twice the amount possible in the formations 3110 and 3120, which may be important for working situations requiring increased payload power consumption from the tailing UAVs. Formations 3150 and 3160 are hybrid formations, which share some of the features with both V-shaped and inverted V-shaped formations. Of course, other formations with different number of UAVs are also possible.

In accordance with embodiments of the present invention, the UAV fleets may maintain communication and computing payloads on station at altitudes above cloud cover even during the longest nights and dimmest days of winter at temperate latitudes. (e.g., at NY, San Francisco, Beijing, Tokyo, latitude ~40, or the like). In such embodiments, the UAV fleets may be powered at least in part by renewable solar energy. In summer time or any time in tropical latitudes, these UAV fleets have approximately 2.5 times more solar energy available to them. Excess energy can be used to provide additional services. In some embodiments of the present invention, internet and computational servers are collocated in UAV fleets, some of which fly over tropical latitudes or migrate seasonally to mitigate winter conditions. At the target flight conditions between 15 and 25 km, air temperature is roughly −40 degrees Celsius, air velocity will be roughly 100 km/hr, and average insolation often greater than 40% peak over ground level, because of absence of cloud cover. Therefore, collocation of computational servers (such as cloud servers) in summer UAV fleets will be more economic than terrestrial server farms with air conditioning, leased floor space, and external network fees. This economic advantage will accelerate as solar power with battery storage achieves grid parity, and UAV fleets fly globally. Collocation of communication and computational services in UAV fleets also improves speed relative to prior art terrestrial services, since free space optical and radio ATA links have transmission velocities approximately 1.5 times greater than fiber optics.

Figure 32:
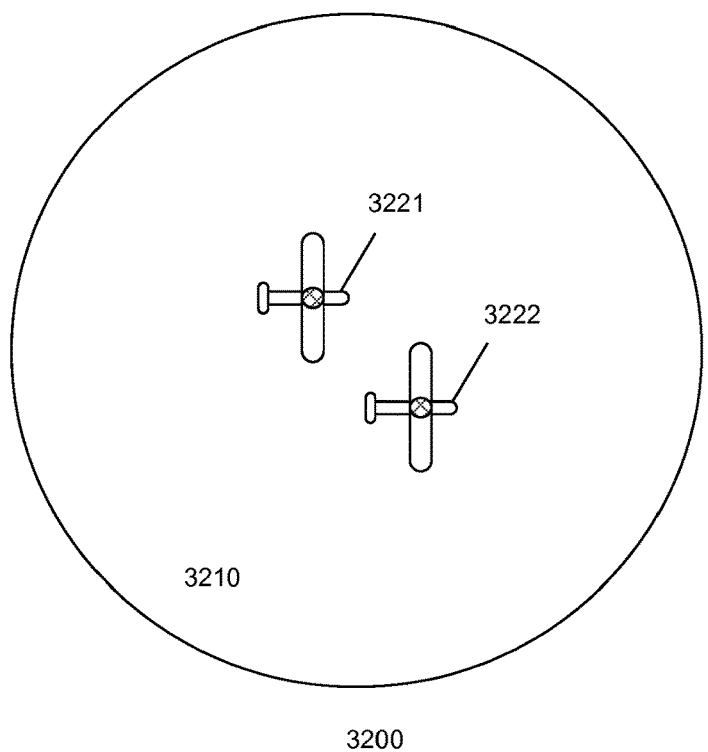
FIG. 32 depicts a schematic view of a distributed communication system, comprising a fleet of two UAVs that service a single communication cell, in accordance with some embodiments of the present invention.

In accordance with embodiments of the present invention, the size and extent of an airborne wireless communication node, i.e. a UAV fleet, may be determined by several factors, including application requirements, individual UAV specifications and capabilities, payload distribution, safety regulations, regional specifics, renewable energy resources available and so on. In any case, the size of the fleet is given by the maximum separation in the horizontal plane between any two UAVs within the fleet, which in turn may be referenced and compared to the size of corresponding communications cells as produced on the ground by one or more UAVs. FIG. 32 shows a distributed communication system 3200 comprising a fleet of two UAVs 3221 and 3222, which service a single communication cell 3210. The size of this fleet as determined by the distance between UAVs 3221 and 3222 may be smaller than the size of the communication cell 3210. This distance may be determined by either the ATA communication link distance, the most optimal separation for flight formation, weather conditions or other factors and combination thereof. This distance may be also smaller than the average altitude of the UAV fleet. For example, the UAVs may be less than 1 km apart, while flying at an altitude of 20 km and producing a cell of 10 km across. Constituent UAVs in the distributed communication system 3200 may perform similar or alternatively different functions. For example, the UAV 3221 may function as an ATU transmitter and the UAV 3222 may function as an ATU receiver within the same communication cell 3210.

Figure 33:
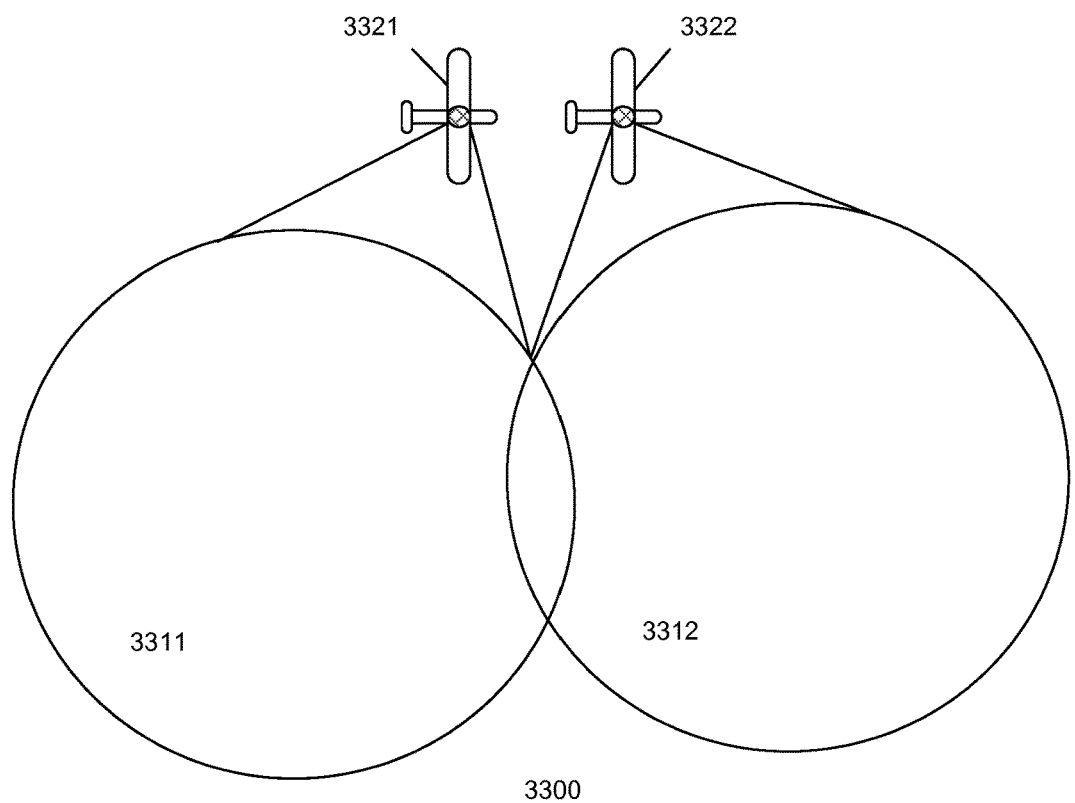
FIG. 33 depicts a schematic view of a distributed communication system, comprising a fleet of two UAVs that respectively service two different communication cells, in accordance with some embodiments of the present invention.

In accordance with embodiments of the present invention, FIG. 33 shows another exemplary embodiment of a distributed communication system 3300 comprising a fleet of two UAVs 3321 and 3322, which service two different communication cells 3311 and 3312, respectively. The size of this fleet as determined by the distance between UAVs 3321 and 3322 may be smaller than the combined size or extent of communication cells 3311 or 3312. It may be smaller than the size of either communication cells 3311 or 3312 (i.e. the diameter of a cell for a round cell). It may be also smaller than the average separation between the communication cells 3311 and 3312 (i.e. the distance between the cell centers). The UAV fleet may be positioned directly above one of the cells, the overlapped region between the cells or sideways with respect to either of the cells as shown in FIG. 33.

Figure 34:
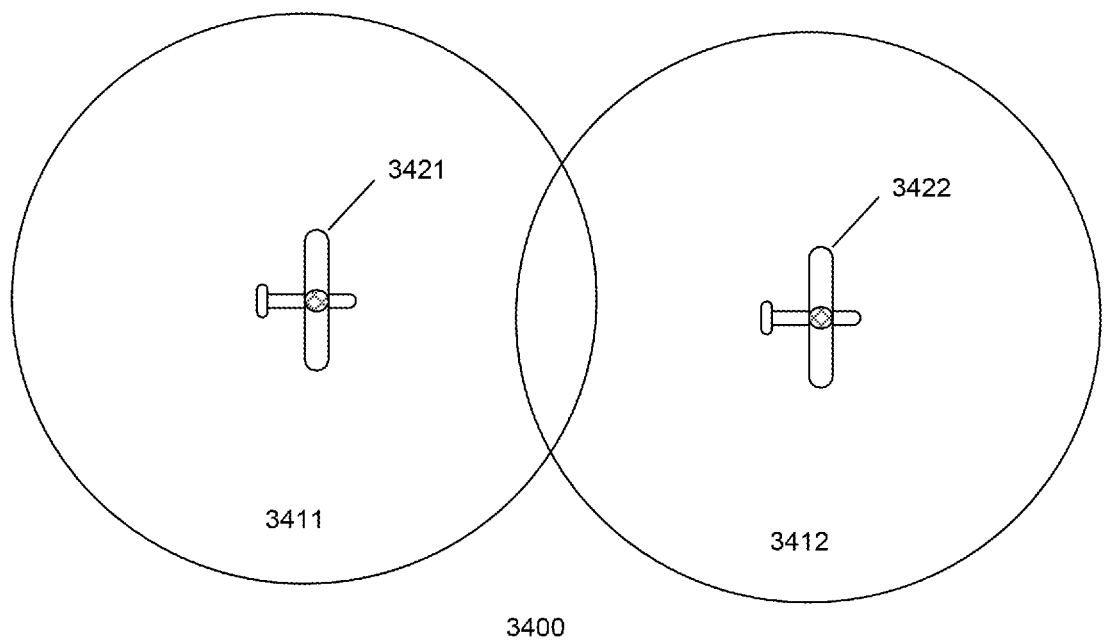
FIG. 34 depicts a schematic view of a distributed communication system, comprising a fleet of two UAVs that respectively service two different communication cells, in accordance with some embodiments of the present invention.

In accordance with embodiments of the present invention, FIG. 34 shows another exemplary embodiment of a distributed communication system 3400 comprising a fleet of two UAVs 3421 and 3422, which service two different communication cells 3411 and 3412, respectively. In this case, the fleet size may be similar or larger than the size of the respective communication cells or separation between the cells. It may be preferable in this case to position each UAV directly above a corresponding communication cell as shown in FIG. 34. UAVs in the distributed communication systems 3200, 3300 and 3400 may produce and service more than one communication cells. Furthermore the number of communication cells these UAVs service may be different from each other. Furthermore, some UAVs may be used for providing ATG links, in which case the fleet size may be compared to the distance between the ground-based gateway station and the UAV fleet. The UAV fleet with a distributed communication payload may be smaller in its extent in comparison to the average distance to its gateway station.

Figure 35:
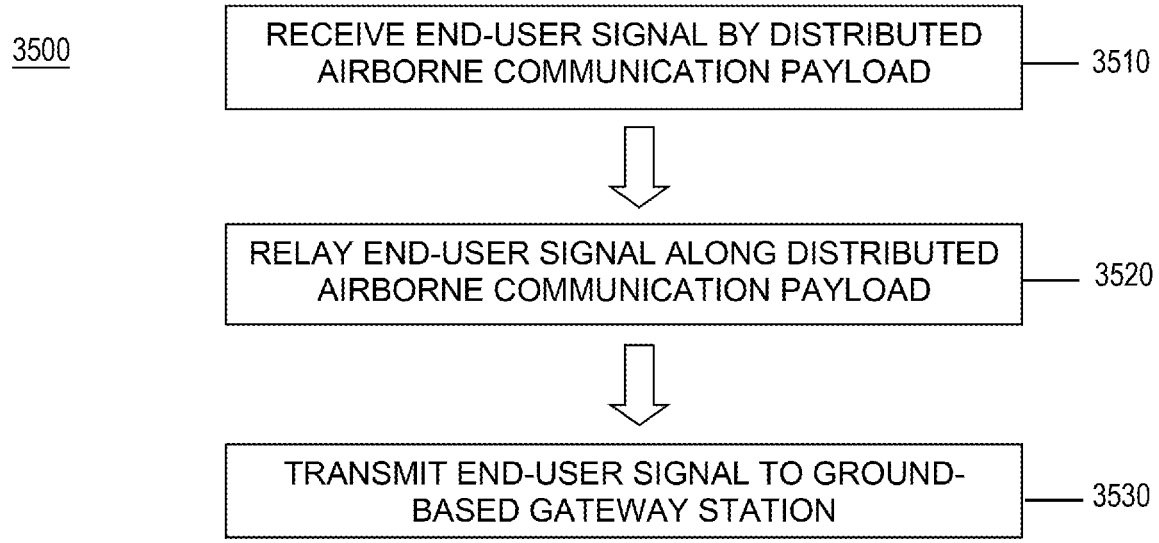
FIG. 35 depicts a flow chart of a method for communicating using a distributed airborne wireless system in accordance with some embodiments of the present invention.

In accordance with another aspect of the present invention, FIG. 35 shows a method 3500 for communicating using a distributed airborne wireless system. The method 3500 includes receiving an end-user signal by a distributed payload at 3510, for example from an end-user in a ground cell or air cell as described above. Receiving the end-user signal may be enabled by the use of ATU link equipment to provide wireless links between UAVs and end-users. Next, the end-user signal may be relayed along the distributed payload at 3520, for example, within a UAV fleet, between UAV fleets, or as otherwise described above. Relaying the end-user signal may be enabled by the use of ATA link equipment, providing wireless links between different UAVs. Optionally, the end-user signal may be transmitted to the ground gateway station or to another end-user on the ground and/or surrounding airspace at 3530, if required. The link to the ground gateway station may be provided using ATG communication equipment. Additional actions are also possible, such as receiving and transmitting signals from/to communication satellites, other aircraft, terrestrial cellular stations, other airborne wireless systems and so on.

Furthermore, another method of communicating using such a system includes a method of transmitting a signal to the end-user, which is the reverse of the process described in FIG. 35. For example, the method may begin by receiving a signal to be transmitted to an end-user from the ground gateway station. Next, the signal may be relayed along the distributed payload. Lastly, the signal may be transmitted to the ground-based gateway station for ultimate routing to other end-users or alternatively it may be routed directly to another end-user without passing through the gateway station.

Figure 36:
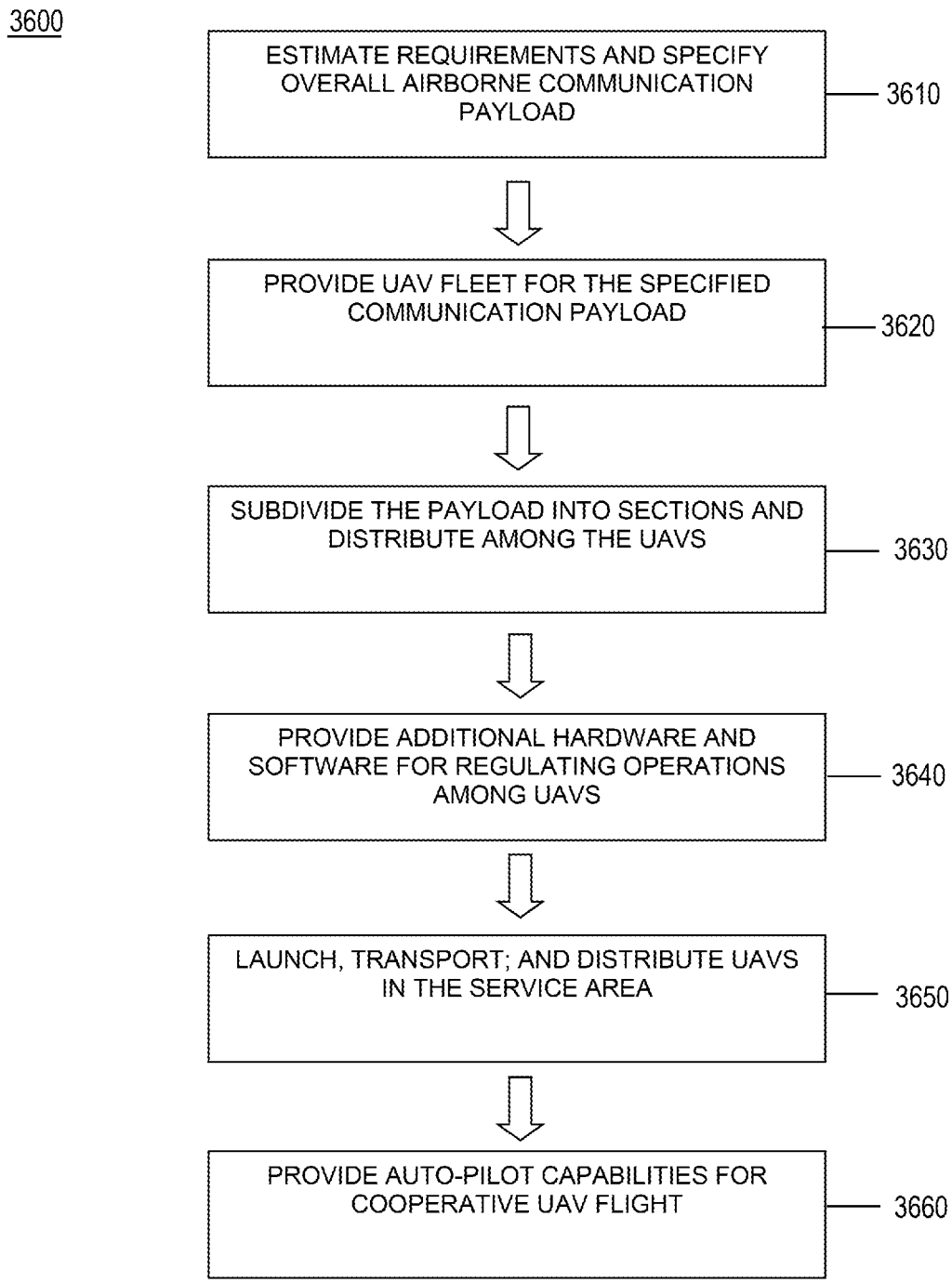
FIG. 36 depicts a flow chart of a method for providing a distributed airborne wireless communication node in accordance with some embodiments of the present invention.

In accordance with another aspect of the present invention, FIG. 36 shows a method 3600 for providing a distributed airborne wireless communication node. The method 3600 includes estimating application requirements for an overall communication payload within a given service area, as indicated at 3610. Next, as indicated at 3620, a UAV fleet is provided that is comprised of a number of UAV platforms with a net payload power and weight capabilities that are equal to or greater than the specified communication payload power and weight requirements, respectively. Finally, as indicated at 3630, the specified communication payload is subdivided into payload sections, so that each section may be mounted on a single UAV platform with power and weight requirements that are equal to or less than payload power and weight capabilities of a respective UAV platform. Subdividing the payload into separate functional sections may be accomplished without sacrificing the overall functionality of the payload as a whole. Subdividing the payload into separate functional sections also takes into account an overhead (a penalty from additional weight and power requirements) resulting from additional intra-node communications between individual UAVs in the fleet.

Furthermore, the method 3600 may include several additional or optional actions as shown further in FIG. 36. For example, as indicated at 3640, the method 3600 may further include providing additional equipment for ATA communications between individual UAVs within the fleet, hardware and software for organizing and synchronizing operations of individual UAVs, a node controller and other elements for regulating node operations. The method 3600 may also include launching the fleet into airspace, transporting the fleet to the service area, distributing the fleet within the service area for best coverage and performance, as indicated at 3650. UAVs may be launched and transported simultaneously and concurrently or non-simultaneously and separately. Furthermore, the method 3600 may include providing auto-pilot capabilities to one or more UAVs within the fleet, which enable cooperative flight patterns, collision avoidance, formation flights, more efficient wind or solar energy harvesting (e.g., as described in above-referenced U.S. Pat. No. 8,448,898) and so on, as indicated at 3660.

Figure 37:
FIG. 37 depicts a flow chart of a method for providing a distributed airborne wireless communication node in accordance with some embodiments of the present invention.
Figure 37:

In accordance with yet another aspect of the present invention, FIG. 37 shows a method 3700 for providing a distributed airborne wireless communication node. The method 3700 includes providing a number of UAV platforms with fixed predetermined payload capabilities, such as payload power, weight, operating temperature, and so on, as indicated at 3710. Next, the method 3700 includes providing a range of communication payload sections with requirements that can be satisfied by the capabilities of a single UAV platform, as indicated at 3720. Some of such payload sections are illustrated in FIG. 4, which may include sections of ATU, ATA, and ATG link equipment, as well as sections of a communications control module. Finally, the method 3700 includes mounting payload sections onto UAV platforms and forming a UAV fleet with net communication payload capabilities of an airborne wireless communication node, such as acceptable data/voice formats, maximum data transfer rates, ground cell coverage area, maximum link range, maximum number of users, user density, and so on, as indicated at 3730. The net payload capabilities can be deduced and estimated from the sum of the capabilities of its constituent sections. In some embodiments, application requirements for a network node may exceed capabilities of any single payload section. As a result, a single UAV may not be able to provide a fully functional node, so that a UAV fleet may be required given the limited capabilities of a single UAV platform and the superior capabilities of a UAV fleet.

Figure 38:
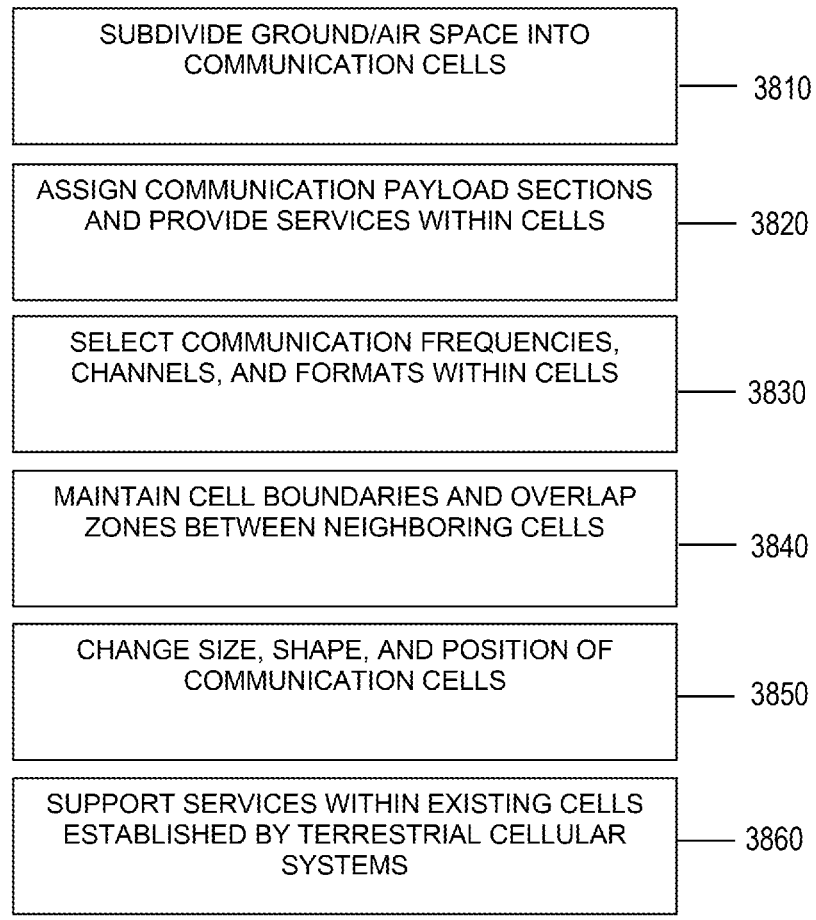
FIG. 38 depicts a chart of additional actions, which could compliment methods shown in FIGS. 36 and 37, in accordance with some embodiments of the present invention.

In accordance with another aspect of the present invention, FIG. 38 shows additional actions (generally labeled 3800), which could compliment methods 3600 and 3700. Such actions include subdividing the ground area and the airspace area around and below the UAV fleet into communication cells, thus producing an airborne cellular map, as indicated at 3810; assigning communication payload sections to respective communication cells and providing communication services (e.g., ATU links) within the communication cells by respective payload sections, as indicated at 3820; selecting frequency bands, channels and formats for ATU communications within the communication cells to optimize ATU link performance and minimize interference between neighboring cells, as indicated at 3830; maintaining boundaries of each communication cell and the overlap zones or regions between neighboring or overlapping communication cells, as indicated at 3840; changing the at least one of the size, shape, or position of one or more communication cells (including elimination of one or more communication cells from the cellular map), as indicated at 3850; and supporting communication services within existing communication cells established by terrestrial wireless providers, as indicated at 3860.

The process of cellular subdivision and mapping of the ground area and surrounding airspace may include coordination with existing cellular maps from terrestrial and other airborne wireless service providers. In addition, airborne cellular mapping may be correlated with other terrestrial infrastructure, such as road maps, town maps, population density distributions, ground vehicle traffic patterns and so on. The process of assigning payload sections to particular cells (and vice versa) may include selecting ATU link equipment sections for ATU uplink and downlink, respectively. One cell may be serviced by multiple payload sections carried by multiple UAV platforms. Alternatively, an ATU payload section on a single UAV platform may service multiple cells, using for example a phased array antenna.

The process of frequency, channel, and format section within each cell may be used to optimize airborne node performance by minimizing interference from neighboring cells, existing wireless systems, and other potential sources of radio transmission noise. It may, for example, include a method of selecting different frequency bands at neighboring cells separated by a number of frequency guard bands (at least one). This process may also include satisfying the requirements of local and national authorities in charge of regulating wireless communications in the service area (e.g., choosing frequencies only within the allocated RF spectrum).

The process described at 3840 may be used to maintain a fixed or constant airborne cellular map. Alternatively, the cellular map may be flexible and variable in response to changes in the demand for communication services within the service area. For example, in response to changes in demand, the cellular map may be re-drawn and optimized either from a ground-based control station or using an airborne node controller. The airborne node controller may be either a central master server computer located on one of the UAV platforms or a distributed system of control nodes located on several UAV platforms. The changes in the size, shape, number, and positions of communication cells may occur on different time scales: minor changes (e.g., boundary adjustments) may occur and repeat every minute or so, while major mapping changes (e.g., cell number reduction) may occur only every 12 hours or more. In addition, the airborne node controller may produce different cell maps in different seasons, i.e., different maps for winter, spring, summer, and fall.

While the foregoing is directed to embodiments of the present invention, other and further embodiments of the invention may be devised without departing from the basic scope thereof.

The invention claimed is:

1. An airborne wireless service area, comprising:
   an airborne fleet, comprised of a plurality of aircraft, wherein the airborne fleet is configured to transmit a plurality of first beams at a first radio frequency (RF), wherein the plurality of first beams are characterized by corresponding first frequency band, channel, bandwidth, transmission format, uneven angular field intensity distribution, and boundaries, wherein neighboring first beams have an overlap region, and wherein the neighboring first beams comprise at least one of a different frequency band, channel, or transmission format;
   a distributed communication payload comprising requisite airborne equipment for a communication cell, wherein a total communication payload is subdivided into smaller communication payload sections being constituent subsets that are varied so as to collectively compose the entirety of the airborne equipment, wherein at least one smaller communication payload section is mounted on different ones of the plurality of aircraft, and wherein the smaller communication payload sections comprise overlapping communication payload functionality such that if a smaller communication payload section fails, remaining ones of the smaller communication payload sections are able to provide the communication payload functionality of the failed smaller communication payload section,
   the distributed communication payload comprising:
      a plurality of antennas to transmit the plurality of first beams and to transmit a reshaped plurality of first beams on command, and
      payload control electronics to manage operation of the airborne wireless service area;
   and
      a plurality of first ground communication cells defined by respective boundaries of the plurality of first beams, wherein a size and shape of at least some of the first ground communication cells are altered by transmitting the reshaped plurality of first beams; and
      wherein the payload control electronics include a controller operative to centrally control a first communication payload section of the distributed communication payload located on a first aircraft of the airborne fleet and a second communication payload section of the distributed communication payload located on a second aircraft of the airborne fleet so as to operate as a single network node.

2. The airborne wireless service area of claim 1, wherein at least one of the first communication payload section or the second communication payload section comprises an air-to-user (ATU) link communication subsystem configured to transmit the plurality of first beams, wherein the first beams are further characterized by a transmission direction pointing towards the ground, and wherein a field intensity distribution of some of the plurality of first beams is varied by the ATU link communication subsystem to obtain each reshaped first beam of the reshaped plurality of first beams.

3. The airborne wireless service area of claim 1, wherein the first beams can be received by wireless communication devices.

4. The airborne wireless service area of claim 1, wherein the first communication cell is a ground cell and defined by the first beam boundaries projected onto the ground, and nulls are generated in the field intensity distribution to obtain reshaped first beams of the reshaped plurality of first beams.

5. The airborne wireless service area of claim 1, wherein at least one of the first communication payload section or the second communication payload section comprises an air-to-air (ATA) link communication subsystem, and wherein the first communication cell is an air cell and is defined by a boundary of a first beam projected by the ATA link communication system onto an airspace around at least one aircraft of the airborne fleet.

6. The airborne wireless service area of claim 1, wherein at least two first beams are produced by different aircraft of the airborne fleet.

7. The airborne wireless service area of claim 1, wherein at least one of the first communication cells has at least one of a fixed size, shape, or position.

8. The airborne wireless service area of claim 1, wherein at least one of the first communication cells has at least one of a variable size, shape, or position.

9. The airborne wireless service area of claim 1, wherein the sizes and shapes of each of the first communication cells are about the same.

10. The airborne wireless service area of claim 1, wherein the size or shape of at least one of the first communication cells is substantially different than the size and the shape of at least another one of the first communication cells.

11. The airborne wireless service area of claim 1, wherein the overlap region is substantially smaller in size than at least one of the first communication cells.

12. The airborne wireless service area of claim 1, wherein the overlap region is about equal in size as at least one of the first communication cells.

13. The airborne wireless service area of claim 1, wherein at least two first beams produce first communication cells with substantially equal size, shape, and position.

14. The airborne wireless service area of claim 1, wherein at least one of the first communication cells is round, oval, rectangular, or polygonal in shape.

15. The airborne wireless service area of claim 1, further comprising a plurality of second communication cells, wherein the second communication cells are characterized by having second beams at a radio frequency used for communications and having corresponding second frequency band, channel, bandwidth, transmission format, uneven angular field intensity distribution, and second cell boundaries.

16. The airborne wireless service area of claim 15, wherein the second beams are further characterized by a transmission direction pointing toward the airborne fleet.

17. The airborne wireless service area of claim 15, wherein first and second communication cells are arranged in pairs and the first and second cell boundaries in each pair are about the same in size and shape.

18. The airborne wireless service area of claim 15, wherein at least two second beams are received by different aircraft.

19. The airborne wireless service area of claim 15, wherein the first and the second beams are transmitted and received by different aircraft, respectively.

20. An airborne wireless service area, comprising:
an airborne fleet comprised of multiple aircraft having a distributed communication payload comprising requisite airborne equipment for a communication cell, wherein a total communication payload is subdivided into smaller communication payload sections being constituent subsets that are varied so as to collectively compose the entirety of the airborne equipment, wherein at least one smaller communication payload section is mounted on different ones of the multiple aircraft, and wherein the smaller communication payload sections comprise overlapping communication payload functionality such that if a smaller communication payload section fails, remaining ones of the smaller communication payload sections are able provide the communication payload functionality of the failed smaller communication payload section,
the distributed communication payload comprising:
payload control electronics including a controller to centrally manage operation of the airborne wireless service area; and
a plurality of ground communication cells,
wherein the ground communication cells are characterized by having radio frequency (RF) beams having a frequency used for communications and having corresponding frequency band, channel, bandwidth, transmission format, uneven angular field intensity distribution, and boundaries,
wherein the multiple aircraft comprise equipment configured to transmit the RF beams into at least one of ground or air space within the plurality of ground communication cells and to receive RF communication signals from wireless communication devices within any of the plurality of ground communication cells,
wherein smaller communication payload sections of the payload control electronics that manage at least one of transmitting the RF beams or receiving the communication signals are distributed among at least two of the multiple aircraft, and
wherein a size and shape of at least some of the plurality of ground communication cells are altered by transmitting a reshaped RF beam.

21. A method of providing wireless communication services, comprising:
transmitting a plurality of first beams at a first radio frequency (RF) from an airborne fleet comprised of a plurality of aircraft having a distributed airborne communication payload comprising requisite airborne equipment for a communication cell, wherein a total communication payload is subdivided into smaller communication payload sections being constituent subsets that are varied so as to collectively compose the entirety of the airborne equipment, wherein at least one smaller communication payload section is mounted on different ones of the plurality of aircraft, and wherein the smaller communication payload sections comprise overlapping communication payload functionality such that if a smaller communication payload section fans, remaining ones of the smaller communication payload sections are able provide the communication payload functionality of the failed smaller communication payload section,
wherein the smaller communication payload sections of the distributed airborne communication payload are centrally managed by a controller to function as a single network component,
wherein the plurality of first beams are characterized by corresponding first frequency band, channel, bandwidth, transmission format, uneven angular field intensity distribution, and boundaries,
wherein neighboring first beams have an overlap region, and
wherein at least one of the following characteristics is different between the neighboring first beams: frequency band, channel, or transmission format;
creating a plurality of first ground communication cells defined by respective boundaries of the plurality of first beams, wherein each of the first ground communication cells are characterized by their size, shape, and position; and
modifying a shape of at least one of the first ground communication cells by transmitting a reshaped first beam.

22. The method of claim 21, further comprising transmitting at least one of the first beams in a direction pointing towards the ground and wherein modifying a shape of at least one of the first communication cells comprises altering the field intensity distribution of a first beam pointing toward the ground to obtain a reshaped first beam.

23. The method of claim 22, wherein at least one first communication cell is a ground cell defined by the first beam boundaries projected onto the ground and at least one reshaped communication cell is a ground cell defined by the reshaped first beam.

24. The method of claim 21, wherein at least one first communication cell is an air cell defined by a boundary of one of the plurality of first beams projected onto an airspace around at least one aircraft of the airborne fleet.

25. The method of claim 21, further comprising transmitting at least some respective ones of the plurality of first beams by different aircraft of the airborne fleet.

26. The method of claim 21, further comprising aligning the first communication cell boundaries with landmarks on the ground.

27. The method of claim 21, further comprising constantly changing at least one of the size, shape, or position of the first communication cell.

28. The method of claim 21, further comprising:
creating a plurality of second communication cells, wherein the second communication cells are characterized by having second beams at a radio frequency used for communications and having corresponding second frequency band, channel, bandwidth, transmission format, uneven angular field intensity distribution, and second cell boundaries, wherein the second beams are further characterized by a transmission direction pointing toward the airborne fleet.

29. The method of claim 28, wherein the first and second communication cells are arranged in pairs and the first and second cell boundaries in each pair are about the same in size and shape.

30. The method of claim 1, further comprising generating nulls in the field intensity distribution to obtain reshaped first beams of the reshaped plurality of first beams.

* * * * *